(12) United States Patent
Minari et al.

(10) Patent No.: US 9,416,461 B2
(45) Date of Patent: Aug. 16, 2016

(54) DIE AND METHOD FOR MANUFACTURING DIE, AND ANTI-REFLECTION COATING

(75) Inventors: Chiaki Minari, Osaka (JP); Tokio Taguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 955 days.

(21) Appl. No.: 13/500,515

(22) PCT Filed: Oct. 12, 2010

(86) PCT No.: PCT/JP2010/067868
§ 371 (c)(1),
(2), (4) Date: Apr. 5, 2012

(87) PCT Pub. No.: WO2011/046114
PCT Pub. Date: Apr. 21, 2011

(65) Prior Publication Data
US 2012/0200932 A1    Aug. 9, 2012

(30) Foreign Application Priority Data
Oct. 14, 2009    (JP) .................................. 2009-237777

(51) Int. Cl.
*B28B 7/36*    (2006.01)
*C25D 11/12*    (2006.01)
(Continued)

(52) U.S. Cl.
CPC .............. *C25D 11/12* (2013.01); *B29C 33/424* (2013.01); *B29C 33/56* (2013.01);
(Continued)

(58) Field of Classification Search
CPC ..................... B29C 33/424; B29C 2033/426
USPC ................... 264/219, 220; 425/175, 385
See application file for complete search history.

(56) References Cited

U.S. PATENT DOCUMENTS 5,312,514 A * 5/1994 Kumar .................. H01J 9/025
204/192.1
6,359,735 B1    3/2002 Gombert et al.
(Continued)

FOREIGN PATENT DOCUMENTS

JP    56-051388 A    5/1981
JP    09-304938 A    11/1997
(Continued)

OTHER PUBLICATIONS

Lee et al, Fabrication of Hierarchical Structures on a Polymer Surface to Mimic Natural Superhydrophobic Surfaces, 2007, Advanced Materials, 19, 2330-2335.*
(Continued)

*Primary Examiner* — Timothy Kennedy
(74) *Attorney, Agent, or Firm* — Harness, Dickey & Pierce, P.L.C.

(57) ABSTRACT

A mold includes an anodized porous alumina layer over its surface. The anodized porous alumina layer has a plurality of first and second recessed portions. The plurality of second recessed portions have a two-dimensional size of not less than 190 nm and not more than 50 µm when viewed in a direction normal to the mold surface and have a plurality of minute recessed portions over its inner surface. The plurality of minute recessed portions have a two-dimensional size of not less than 10 nm and not more than 200 nm; and have a two-dimensional size of not less than 10 nm and not more than 200 nm. The plurality of first recessed portions are provided between the plurality of second recessed portions. The average value of the two-dimensional size of the plurality of second recessed portions is greater than that of the plurality of first recessed portions.

11 Claims, 10 Drawing Sheets

(51) Int. Cl.

| | |
|---|---|
| *B29C 33/42* | (2006.01) |
| *B29C 33/56* | (2006.01) |
| *B29D 11/00* | (2006.01) |
| *C25D 11/16* | (2006.01) |
| *C25D 11/24* | (2006.01) |
| *G02B 1/118* | (2015.01) |
| *C25D 11/04* | (2006.01) |

(52) U.S. Cl.
CPC ... *B29D 11/00326* (2013.01); *B29D 11/00634* (2013.01); *C25D 11/045* (2013.01); *C25D 11/16* (2013.01); *C25D 11/24* (2013.01); *G02B 1/118* (2013.01)

(56) References Cited

U.S. PATENT DOCUMENTS

| | | | |
|---|---|---|---|
| 2002/0119394 A1 | 8/2002 | Hultzsch et al. | |
| 2003/0205475 A1 | 11/2003 | Sawitowski | |
| 2006/0055084 A1* | 3/2006 | Yamaguchi et al. | 264/328.16 |
| 2007/0159698 A1 | 7/2007 | Taguchi et al. | |

FOREIGN PATENT DOCUMENTS

| | | |
|---|---|---|
| JP | 2000-239895 A | 9/2000 |
| JP | 2001517319 A | 10/2001 |
| JP | 2002-240448 A | 8/2002 |
| JP | 2003531962 A | 10/2003 |
| JP | 2005156695 A | 6/2005 |
| JP | 2008-213210 A | 9/2008 |
| JP | 4265729 B2 | 2/2009 |
| WO | WO-2006059686 A1 | 6/2006 |

OTHER PUBLICATIONS

Gao et al, Mimicking Biological Structured Surfaces by Phase-Separation Micromolding, 2009, Langmuir, 25(8), pp. 4365-4369.*
International Preliminary Report on Patentability dated May 24, 2012.
International Search Report, (Jan. 25, 2011).

* cited by examiner (a)

(b)

(a)

(b)

(c)

(d)

(e)

(a)

(b)

(a)

(b)

(c)

(d)

(a)

(b)

— 1 —

DIE AND METHOD FOR MANUFACTURING DIE, AND ANTI-REFLECTION COATING

TECHNICAL FIELD

The present invention relates to a mold, a method of fabricating a mold, and an antireflection film. In this specification, the "mold" includes molds that are for use in various processing methods (stamping and casting), and is sometimes referred to as a stamper. The mold can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a moth-eye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

Patent Document 4 discloses the technique of forming an antireflection film with the use of an alumina layer in which very small recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 μm and less than 100 μm. The entire disclosures of Patent Documents 1, 2, and 4 are herein incorporated by reference.

Utilizing an anodized porous aluminum film can facilitate the fabrication of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

A known antireflection film manufacturing method with the use of a moth-eye mold uses a photocurable resin. Firstly, a substrate, such as a film or the like, an uneven surface of a moth-eye mold which has been provided with a mold release treatment, and a photocurable resin are provided. Then, the photocurable resin is applied over the uneven surface of the moth-eye mold. Thereafter, the substrate, such as a film or the like, is pressed against the uneven surface with the photocurable resin interposed therebetween using nip rollers or the like such that air is removed from the applied photocurable resin. As a result, the uneven structure at the surface of the moth-eye mold is filled with the photocurable resin. Then, the photocurable resin in the uneven structure is irradiated with ultraviolet light so that the photocurable resin is cured. Thereafter, the moth-eye mold is separated from the substrate, whereby a cured layer of the photocurable resin to which the uneven structure of the moth-eye mold has been transferred is formed over the surface of the substrate. The method of manufacturing an antireflection film with the use of the photocurable resin is disclosed in, for example, Patent Document 4.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686

SUMMARY OF INVENTION

Technical Problem

The present inventors attempted to manufacture an antireflection film which has a moth-eye structure using a photocurable resin and sometimes found that the moth-eye structure was not formed in some parts of the surface of a work. FIG. 14 shows a SEM image of a portion of the work in which the moth-eye structure was not formed. As shown in FIG. 14, in the surface of the work, a generally-circular area with a diameter of about several tens of micrometers was sometimes found in which the moth-eye structure was not formed. It was confirmed that this problem was attributed to a low wettability for the photocurable resin of the surface of the moth-eye mold. Note that this problem is not limited to the case of the photocurable resin but would occur likewise in the case where a curable resin of any other type, such as a thermosetting resin, or the like, is used.

One of the objects of the present invention is to provide a moth-eye mold which has improved wettability for a curable resin, a method of fabricating the moth-eye mold, and an antireflection film which is manufactured using the moth-eye mold.

Solution to Problem

A mold of the present invention includes an anodized porous alumina layer over its surface. The anodized porous alumina layer has a plurality of first recessed portions and a plurality of second recessed portions. The plurality of second recessed portions have a two-dimensional size of not less than 190 nm and not more than 50 μm when viewed in a direction normal to the mold surface. The plurality of second recessed portions have a plurality of minute recessed portions over its inner surface. The plurality of minute recessed portions have a two-dimensional size of not less than 10 nm and not more than 200 nm. The plurality of first recessed portions have a two-dimensional size of not less than 10 nm and not more than 200 nm. The plurality of first recessed portions are provided between the plurality of second recessed portions. The average value of the two-dimensional size of the plurality of second recessed portions is greater than the average value of the two-dimensional size of the plurality of first recessed portions.

In one embodiment, the area ratio of the plurality of second recessed portions is not less than 0.7%. The surface density of the plurality of second recessed portions is not less than 0.086 counts/μm$^2$.

In one embodiment, the average value of the two-dimensional size of the plurality of second recessed portions is not less than 2.73 times the average value of the two-dimensional size of the plurality of first recessed portions.

In one embodiment, the descending angle of the inner surface of the plurality of second recessed portions relative to the mold surface is not more than 90°. In one embodiment, the descending angle of the inner surface of the plurality of second recessed portions relative to the mold surface is not less than 44.3°.

Here, the "area ratio of second recessed portions" refers to the ratio of an area occupied by the second recessed portions to the unit area. The "descending angle of the inner surface of a plurality of second recessed portions relative to the mold surface" refers to an angle formed at the opening of a second recessed portion between the inner surface of the second recessed portion and the surface of the mold. The "surface density of second recessed portions" refers to the number of second recessed portions per unit area.

In one embodiment, the two-dimensional size of the plurality of second recessed portions is not less than 400 nm and not more than 50 μm, and the area ratio of the plurality of second recessed portions is not less than 0.8%.

An antireflection film of the present invention is an antireflection film manufactured using any of the above-described molds. The antireflection film has a plurality of first raised portions and a plurality of second raised portions over its surface, the plurality of first raised portions having a base whose two-dimensional size is not less than 100 nm and not more than 200 nm, the plurality of second raised portions having a two-dimensional size of not less than 400 nm and not more than 50 μm. The ascending angle of the plurality of second raised portions relative to the surface is not more than 90°.

A mold fabrication method of the present invention is a method of fabricating a mold, the mold including an anodized porous alumina layer over its surface, the anodized porous alumina layer having a plurality of first recessed portions and a plurality of second recessed portions, the plurality of second recessed portions having a two-dimensional size of not less than 190 nm and not more than 50 μm, the plurality of second recessed portions having a plurality of minute recessed portions over its inner surface, the plurality of minute recessed portions having a two-dimensional size of not less than 10 nm and not more than 200 nm, the plurality of first recessed portions having a two-dimensional size of not less than 10 nm and not more than 200 nm when viewed in a direction normal to the mold surface, the plurality of first recessed portions being provided between the plurality of second recessed portions, and an average value of the two-dimensional size of the plurality of second recessed portions being greater than an average value of the two-dimensional size of the plurality of first recessed portions, the method including the steps of: (a) providing an aluminum film or an aluminum base whose purity is not less than 99.5 mass %; (b) performing an etching on a surface of the aluminum film or the aluminum base with the surface of the aluminum film or the aluminum base in an etching solution being in contact with a metal whose standard electrode potential is higher than that of the aluminum film or the aluminum base, thereby forming a plurality of recessed portions whose two-dimensional size is not less than 190 nm and not more than 50 μm; and (c) after step (b), anodizing the surface of the aluminum film or the aluminum base to form a porous alumina layer over an inner surface of the plurality of recessed portions and between the plurality of recessed portions, thereby forming the plurality of first recessed portions and the plurality of second recessed portions.

In one embodiment, the method further includes: (d) after step (c), bringing the porous alumina layer into contact with the etching solution, thereby enlarging the plurality of minute recessed portions and the plurality of first recessed portions; and (e) after step (d), further anodizing the surface of the aluminum film or the aluminum base, thereby growing the plurality of minute recessed portions and the plurality of first recessed portions.

In one embodiment, the method further includes: (f) between step (a) and step (b), anodizing the surface of the aluminum film or the aluminum base, thereby forming an anodized layer; and (g) between step (b) and step (c), dissolving away the anodized layer.

In one embodiment, the two-dimensional size of the plurality of first recessed portions is not less than 100 nm and not more than 200 nm.

Advantageous Effects of Invention

According to the present invention, a moth-eye mold which has improved wettability for a curable resin, a method of fabricating the moth-eye mold, and an antireflection film which is manufactured using the moth-eye mold are provided.

DESCRIPTION OF EMBODIMENTS

Hereinafter, a moth-eye mold and a method of fabricating the moth-eye mold according to an embodiment of the present invention are described with reference to the drawings.

Figure 1:
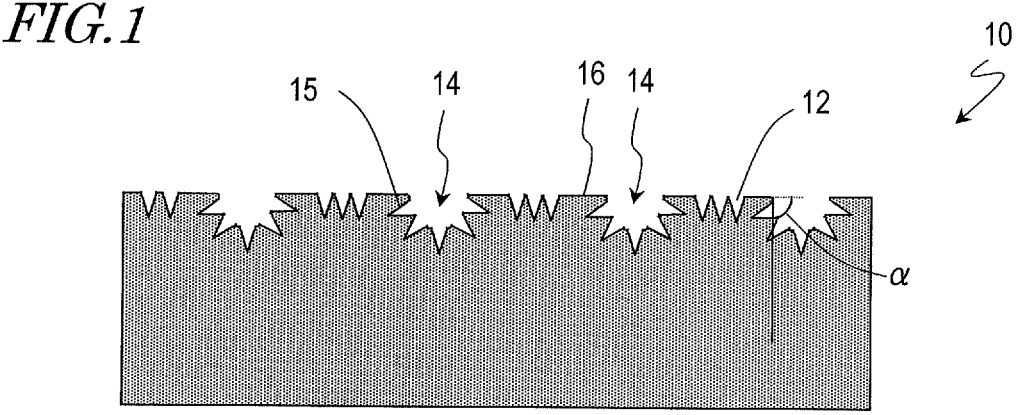
FIG. 1 A schematic cross-sectional view of a moth-eye mold 10 of an embodiment of the present invention.

FIG. 1 is a schematic cross-sectional view of a moth-eye mold 10 of an embodiment of the present invention. As shown in FIG. 1, the moth-eye mold 10 includes an anodized porous alumina layer over its surface. The anodized porous alumina layer has a plurality of first recessed portions 12 and a plurality of second recessed portions 14. The plurality of second recessed portions 14 have a two-dimensional size of not less than 190 nm and not more than 50 μm when viewed in a direction normal to the mold surface. Each of the second recessed portions 14 has a plurality of minute recessed portions 15 over its inner surface. Each of the minute recessed portions 15 has a two-dimensional size of not less than 10 nm and not more than 200 nm. The plurality of first recessed portions 12 have a two-dimensional size of not less than 10 nm and not more than 200 nm and are provided between the plurality of second recessed portions 14. The average value of the two-dimensional size of the plurality of second recessed portions 14 is greater than the average value of the two-dimensional size of the plurality of first recessed portions 12. Note that the two-dimensional size can be approximately represented by the diameter of a circle. The plurality of minute recessed portions 15 formed in the inner surfaces of the plurality of second recessed portions 14 and the plurality of first recessed portions 12 constitute the "inverted moth-eye structure" which has been previously described.

As described above, in the moth-eye mold 10, a porous alumina layer which has a plurality of micropores is provided in the inner surfaces of the plurality of second recessed portions 14 and between the plurality of second recessed portions 14. Part of the micropores of the porous alumina layer which are provided between the plurality of second recessed portions 14 are referred to as "first recessed portions 12". The other part of the micropores of the porous alumina layer which are provided in the inner surfaces of the plurality of second recessed portions 14 are referred to as "minute recessed portions 15".

If the two-dimensional size of the second recessed portion 14 is not less than 190 nm, part of a droplet can enter the second recessed portion 14 as will be described later. Also, as will be described later, raised portions which are obtained by inverting the second recessed portions 14 can perform the antiglare function. When an antiglare structure is formed by the second recessed portions 14, the two-dimensional size of the second recessed portions 14 is preferably not more than 50 μm.

In that case, the area ratio of the plurality of second recessed portions 14 is preferably not less than 0.7%. The descending angle α of the inner surfaces of the plurality of second recessed portions 14 relative to a surface 16 is preferably not more than 90°. Note that, in the moth-eye mold 10 shown in FIG. 1, the descending angle α is 90°.

As will be described later with experiment examples, since the moth-eye mold 10 of the present embodiment has the second recessed portions 14 whose two-dimensional size is not less than 190 nm and not more than 50 µm, the moth-eye mold 10 has improved wettability for a curable resin. The mechanism through which the second recessed portions 14 improve the wettability is described hereinafter. Here, the index that indicates the wettability is the contact angle of the moth-eye mold 10 for the curable resin. Hereinafter, the mechanism through which the second recessed portions 14 provided in the moth-eye mold 10 can decrease the contact angle for the curable resin is described with reference to FIG. 2 and FIG. 3.

Figure 2:
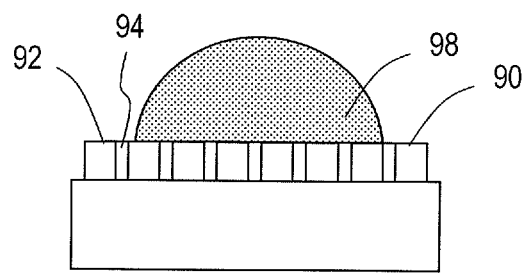
FIG. 2 A diagram for illustrating the contact angle of a water droplet 98 on a complex surface 90.

FIG. 2 is a schematic cross-sectional view for illustrating the contact angle of a water droplet 98 on a complex surface 90 which is formed by portions of the first material (first material portions 92) and portions of the second material (second material portions 94). Here, the apparent contact angle θc for the water droplet 98 of the complex surface 90 shown in FIG. 2 which is formed by the first material portions 92 and the second material portions 94 is expressed by the Cassie's formula (1) shown below. In formula (1), f1 is the fraction of the first material portions, f2 is the fraction of the second material portions (f2=1−f1), θ1 is the true contact angle of the surface of the first material portions, and θ2 is the true contact angle of the surface of the second material portions.

$$\cos θc = f1 \cos θ1 + f2 \cos θ2 \quad (1)$$

The surface of a solid of the first material, which has minute recessed portions that a water droplet cannot completely enter so as to reach the bottoms of the minute recessed portions, can be assumed as the complex surface 90 which is formed by the portions 92 that are formed of the first material and the portions 94 that are formed of air as the second material. Here, θ2 is the contact angle of air for water. The water is spherical when it is afloat in the air, and therefore, the contact angle θ2 of the air in the minute recessed portions can be estimated to be 180°. In this case, in formula (1), cos θ2=−1. The value of cos θc is small as compared with a case where the minute recessed portions are not provided. In other words, if the surface of the solid has minute recessed portions that a water droplet cannot enter, the apparent contact angle θc of the complex surface 90 increases. The reason why the mold surface which has an inverted moth-eye structure has low wettability after the mold releasing process is that a droplet (water droplet, resin droplet, or the like) cannot completely enter the minute recessed portion so as to reach the bottom.

Figure 3:
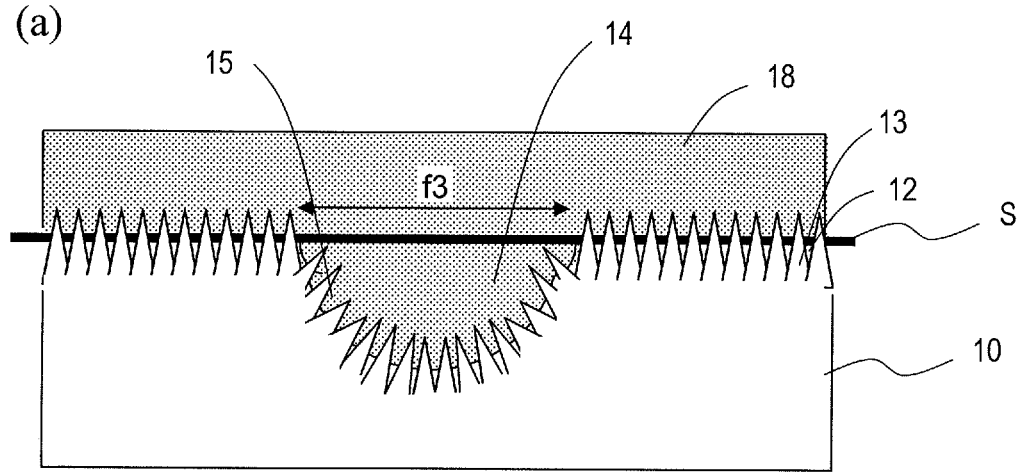
FIGS. 3(a) and (b) are schematic diagrams for illustrating the contact angle of a water droplet 18 on the surface of the moth-eye mold 10.
Figure 3:
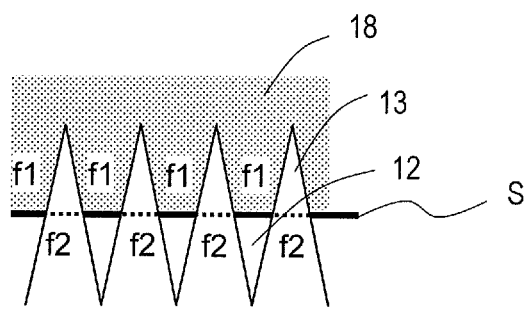

FIGS. 3(*a*) and 3(*b*) are schematic cross-sectional views for illustrating the contact angle for a water droplet 18 dropped on the surface of the moth-eye mold 10 of the present embodiment. The surface of the moth-eye mold 10 has the first recessed portions 12 that constitute the inverted moth-eye structure and the second recessed portions 14 that are greater than the first recessed portions 12. The inner surface of the second recessed portion 14 has the minute recessed portions 15. The water droplet is dropped on a region which includes the second recessed portion 14. FIG. 3(*a*) is a schematic cross-sectional view of the region which includes the second recessed portion 14. FIG. 3(*b*) is a schematic enlarged cross-sectional view showing part of FIG. 3(*a*) which only includes the first recessed portions 12.

As shown in FIG. 3(*b*), the two-dimensional size of the first recessed portions 12 is such that a water droplet cannot completely enter the first recessed portions 12 so as to reach their bottoms, so that there is air in the first recessed portions 12. Hereinafter, the surface droplet level S such as shown in FIGS. 3(*a*) and 3(*b*) is considered. As shown in FIG. 3(*b*), each of the plurality of first recessed portions 12 has an interface between the air trapped in the first recessed portion 12 and the water droplet. The surface droplet level S is formed by connecting these interfaces. The two-dimensional size of the second recessed portion 14 is such that the water droplet can enter the second recessed portion 14 to a level deeper than the surface droplet level S. When the water droplet 18 is dropped on the surface of the moth-eye mold 10, as schematically shown in FIG. 3(*a*), the water droplet 18 does not reach the bottoms of the first recessed portions 12 so that the surface droplet level S is formed, while in the second recessed portion 14, the water droplet 18 reaches a level deeper than the surface droplet level S. In other words, in the minute recessed portions 15 provided in the second recessed portion 14, the interface between the air trapped in the minute recessed portions 15 and the water droplet is deeper than the surface droplet level S. Therefore, the apparent contact angle on the surface of the moth-eye mold 10 which has the above-described structure (the apparent contact angle at the surface droplet level S), θc, can be expressed by formula (2) shown below. Formula (2) is obtained by adding, to the right side of formula (1) shown above, the contribution of the second recessed portion 14 that the water droplet enters as the third term.

$$\cos θc = f1 \cos θ1 + f2 \cos θ2 + f3 \cos θ3 \quad (2)$$

At the surface droplet level S, as shown in FIGS. 3(*a*) and 3(*b*), there are a region occupied by the second recessed portion 14, a region occupied by the first recessed portions 12, and a region of the first material which is provided between adjoining ones of the first recessed portions 12 (referred to as "protrusion portions 13"). In formula (2) shown above, f1 is the fraction of the region of the first material which is provided between adjoining ones of the first recessed portions 12 (protrusion portions 13) per unit area, f2 is the fraction of the first recessed portions 12 per unit area, and f3 is the fraction of the second recessed portions 14 per unit area (f1+f2+f3=1). As in above formula (1), θ1 is the true contact angle of the first material, and θ2 is the contact angle of the air trapped in the first recessed portions 12)(180°). θ3 is the contact angle of the second recessed portion 14 at the surface droplet level S. Since the water droplet 18 enters the second recessed portion 14 so as to reach a level deeper than the surface droplet level S, θ3 can be assumed as the contact angle of water for water. Thus, it can be assumed that θ3=0°. In this case, cos θ3=1. Therefore, by forming the second recessed portions 14 in which the water droplet can reach a level deeper than the surface droplet level S, the apparent contact angle θc of the surface of the moth-eye mold 10 can be decreased.

Here, the contact angle for water is described. However, the contact angle for a curable resin can also be decreased by forming the second recessed portions 14 for the same reasons.

In the experiment examples which will be described later, the wettability for water was evaluated, rather than the wettability for the curable resin. The surface tension of water is 72 to 73 nN/m at room temperature, which is higher than the surface tension of the curable resin. Therefore, when water is used, a slight variation of the surface condition can be clearly measured in the form of a variation of the contact angle.

Since the moth-eye mold 10 of an embodiment of the present invention has the second recessed portions 14 whose two-dimensional size when viewed in a direction normal to the mold surface is not less than 190 nm and not more than 50 µm, the wettability for the curable resin of the mold surface can be increased. As seen from formula (2), as the fraction f3 of the second recessed portions 14 is larger, the contact angle θc can be made smaller. To obtain sufficient wettability for the curable resin, the fraction (area ratio) of the second recessed portions 14 is preferably not less than 0.7% as will be described later with experiment examples.

The present inventors fabricated a mold which has an anodized porous alumina layer over its surface and examined, for the purpose of improving the wettability, the effects of the average size, area ratio, and surface density (number density) of the second recessed portions 14 on the wettability. Hereinafter, the results of the examination are described. In the experiments described below, a mold release treatment was performed on the surface of the fabricated mold, and the wettability for water of the mold surface after the mold release treatment was evaluated. The mold release treatment was realized by applying a fluoric mold releasing agent. The reason why the wettability of the mold surface after the mold release treatment was evaluated is that, in the transfer step of the antireflection film, the surface of a mold with which a curable resin or the like comes in contact is provided with a mold release treatment. The index used for the evaluation of the wettability was the contact angle. Note that it was experimentally confirmed that there is a correlation between the wettability for water of the surface of the mold (the contact angle for water) and a failure of forming the above-described moth-eye structure in some portions.

Now, a method of fabricating the moth-eye mold of the embodiment of the present invention is briefly described. The moth-eye mold may be fabricated by repeating the step of anodizing an aluminum base and the etching step for enlarging recessed portions formed by the anodization as described in Patent Documents 1, 2, and 4. A method of fabricating the moth-eye mold 10 according to an embodiment of the present invention includes, as will be described later in detail, the step of etching an aluminum base with the aluminum base in an etching solution being in contact with an electrode which contains a metal whose standard electrode potential is higher than that of the aluminum base in the first cycle of the etching step, thereby forming a plurality of recessed portions whose two-dimensional size is not less than 190 nm and not more than 50 μm (recessed portions 17 shown in FIG. 8(b)) That is, the plurality of recessed portions whose two-dimensional size is not less than 190 nm and not more than 50 μm are formed by galvanic corrosion in the first cycle of the etching step. The plurality of second recessed portions 14 are realized by performing the anodization after the formation of the plurality of recessed portions whose two-dimensional size is not less than 190 nm and not more than 50 μm, such that a plurality of minute recessed portions 15 are formed in the inner surfaces of the second recessed portions 14.

The second and subsequent cycles of the etching step are performed under the conditions that would not cause galvanic corrosion as in the conventional etching step. For example, the etching is performed after the electrode is disconnected from the aluminum base, or the etching is performed with the electrode being kept separate from the etching solution. Hereinafter, an etching which is performed under the conditions that would not cause galvanic corrosion is sometimes referred to as "usual etching".

As described above, the inverted moth-eye structure is commonly formed by repeating the anodization and the etching two or more times. In the experiment, firstly, molds which have an inverted moth-eye structure formed by performing the anodization once and the etching once (hereinafter, referred to as "pseudo moth-eye mold") were prepared, and the contact angle of the pseudo moth-eye molds was examined. Here, four types of pseudo moth-eye molds 10A, 10B, 10C, and 10D which have a plurality of second recessed portions 14 were fabricated as described below.

First, an aluminum base was anodized to form an anodized layer (porous alumina layer). The anodization conditions were such that the treatment solution was oxalic acid (0.05 mol/L, temperature: 5° C.), the voltage was 80 V, and the duration was 1 min.

Then, the etching was performed on the aluminum base with the aluminum base in the etching solution being in contact with an electrode which contains a metal whose standard electrode potential is higher than that of the aluminum base, whereby a plurality of recessed portions were formed. The etching conditions were such that the etching solution was phosphoric acid (1 mol/L(liter)), and the treatment temperature was 30° C., in either of the fabrication processes of the molds. The etching durations for the pseudo moth-eye molds 10A, 10B, 10C, and 10D were 50 minutes, 60 minutes, 70 minutes, and 80 minutes, respectively. By changing the etching duration (immersion duration), the number, average size, and occupied area of the plurality of recessed portions formed were changed. In this way, the number, average size, and occupied area of the plurality of recessed portions formed in the etching step were changed, whereby the number, average size, and occupied area of the second recessed portions 14 which were formed in a later step were changed.

Subsequently, the usual etching step was performed under the above-described etching conditions for 40 minutes, 30 minutes, 20 minutes, and 10 minutes for the respective molds, whereby the anodized layer which was formed by the above-described anodization was completely removed.

Figure 8:
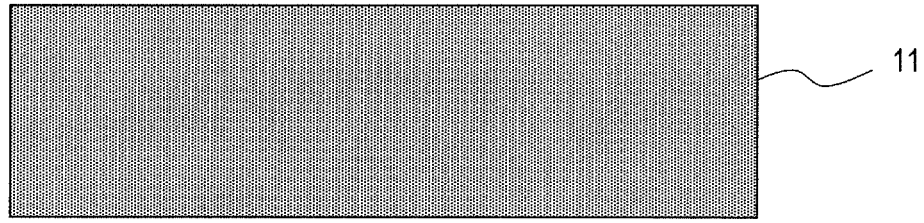
FIG. 8(a) to (d) are schematic cross-sectional views for illustrating a method of fabricating a moth-eye mold of the present embodiment.
Figure 8:
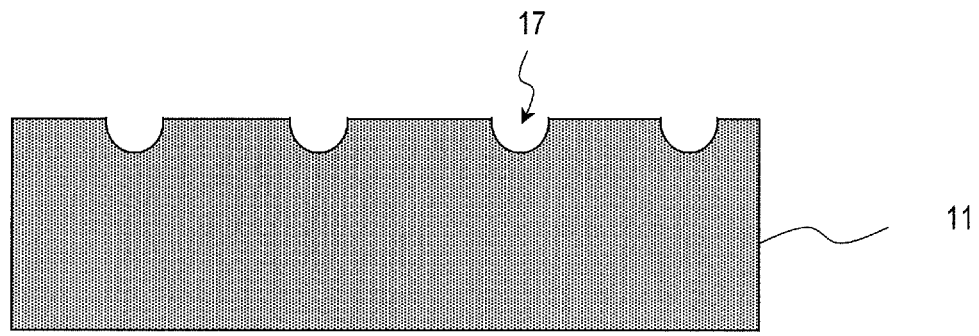
Figure 8:
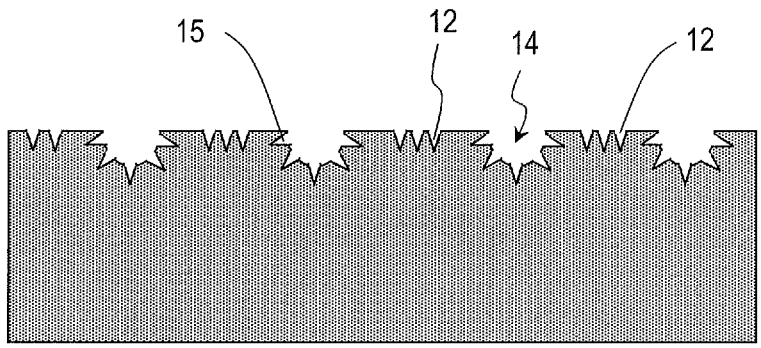
Figure 8:
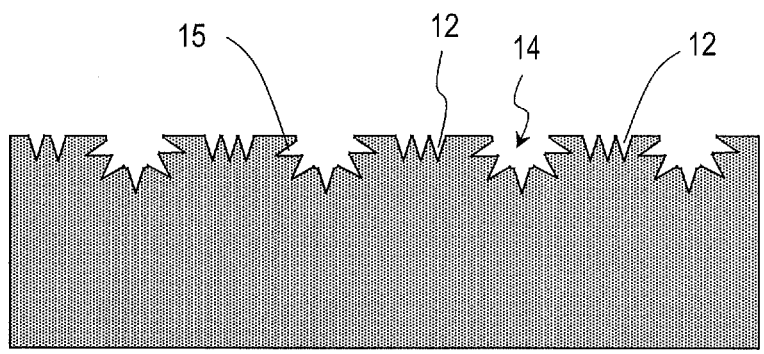

Then, the anodization was performed for 40 seconds under the same anodization conditions as those described above, whereby a porous alumina layer was formed over the inner surfaces of a plurality of recessed portions 17 (FIG. 8(b)) and between the plurality of recessed portions 17. In this way, the plurality of second recessed portions 14 were formed so as to have a shape such that the plurality of minute recessed portions 15 were provided over the inner surfaces. Meanwhile, the plurality of first recessed portions 12 were formed between the plurality of second recessed portions 14.

Then, the usual etching step was performed for 45 minutes under the same etching conditions as those described above, whereby the pore diameter of the micropores of the porous alumina layer was increased. Specifically, the pore diameter of the plurality of first recessed portions 12 and the pore diameter of the plurality of minute recessed portions 15 formed in the inner surfaces of the second recessed portions 14 were increased. In this way, the pseudo moth-eye molds 10A, 10B, 10C, and 10D were obtained among which the number, average size, and occupied area of the second recessed portions 14 were different.

For the sake of comparison, a pseudo moth-eye mold 20A which did not have second recessed portions was fabricated, and the contact angle of the pseudo moth-eye mold 20A was examined. The pseudo moth-eye mold 20A was fabricated as described hereinafter. First, the anodization was performed for 1 minute under the same anodization conditions as those employed in the fabrication processes of the above-described pseudo moth-eye molds 10A, 10B, 10C, and 10D, whereby an anodized layer was formed. Thereafter, the usual etching was performed for 90 minutes under the same etching conditions as those described above, whereby the anodized layer was completely removed. Then, the anodization was performed once for 40 seconds under the same conditions, and thereafter, the usual etching step was performed once for minutes under the same conditions, whereby the pseudo moth-eye mold 20A was fabricated. In the fabrication process of the pseudo moth-eye mold 20A, the first cycle of the etching step was performed as described above while the aluminum base was not in contact with the electrode which contained a metal whose standard electrode potential is higher than that of the aluminum base. Therefore, the pseudo moth-eye mold 20A did not have the second recessed portions.

The first recessed portions of the pseudo moth-eye molds 10A, 10B, 10C, and 10D have a generally cylindrical shape. As will be described later, the first recessed portions of the moth-eye mold have a generally conical shape because they are formed by repeating the anodization and the etching two or more times. The first recessed portions 12 of the pseudo moth-eye molds 10A, 10B, 10C, and 10D have a generally cylindrical shape because they are formed by only performing the anodization once and the etching once. Also, the plurality of minute recessed portions 15 formed in the inner surfaces of the second recessed portions 14 of the pseudo moth-eye molds 10A to 10D have a generally cylindrical shape for the same reason. Also, for the same reason, a plurality of minute recessed portions (micropores) of the pseudo moth-eye mold 20A have a generally cylindrical shape. When they have a generally conical shape, the variation in shape or depth may increase. In the pseudo moth-eye molds 10A to 10D, the shape of the first recessed portions 12 was generally cylindrical, so that the cause of the variation of the first recessed portions 12 could be eliminated in examining the effects of the differences in number, average size, and occupied area of the second recessed portions 14 on the contact angle.

Figure 4:
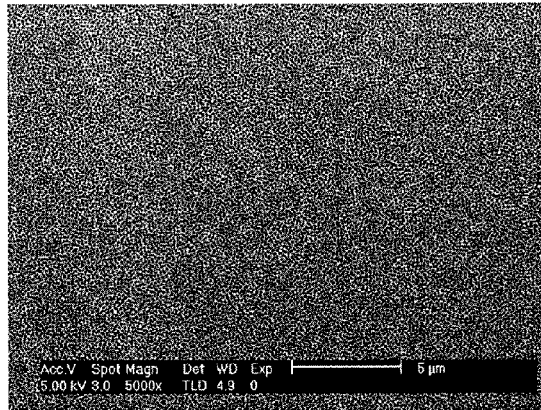
FIGS. 4(a), (b), (c), (d), and (e) are SEM images of the surfaces of pseudo moth-eye molds 20A, 10A, 10B, 10C, and 10D, respectively.
Figure 4:
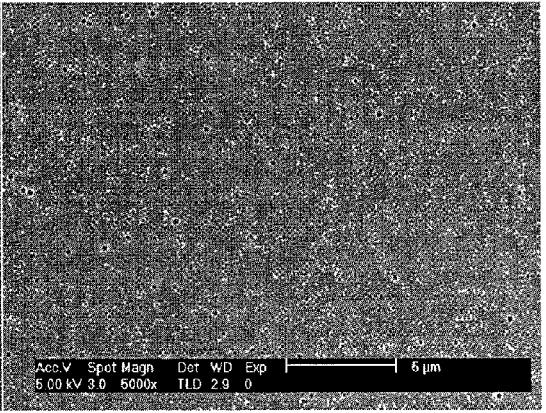
Figure 4:
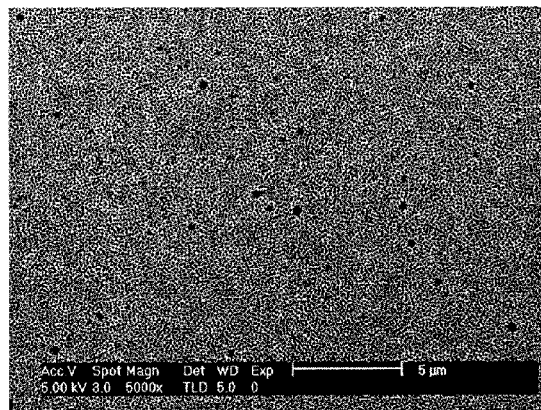
Figure 4:
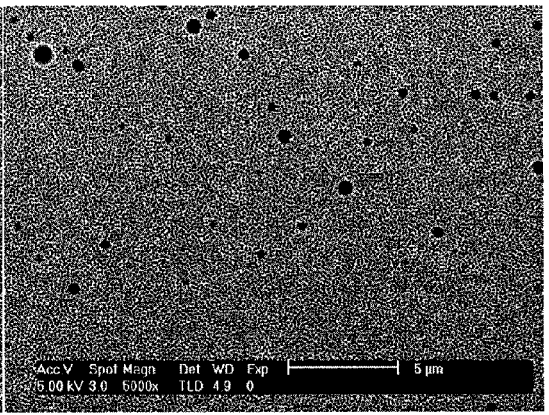
Figure 4:
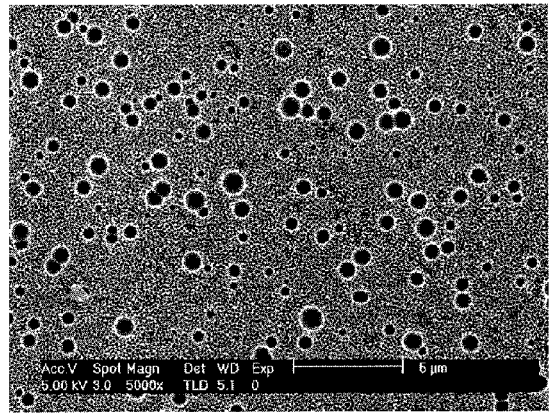

FIG. 4(a) shows a SEM image of a surface of the pseudo moth-eye mold 20A that does not have the second recessed portions. FIGS. 4(b) to 4(e) show SEM images of surfaces of the pseudo moth-eye molds 10A, 10B, 10C, and 10D that have the second recessed portions 14. The viewing field of either of these SEM images is 18.5 µm×25 µm (=462.5 µm²).

As seen from FIG. 4(a), the pseudo moth-eye mold 20A have minute recessed portions which are provided generally uniformly over the entire surface of the mold. The distribution of the plurality of minute recessed portions has no regularity. The average value of the distance between adjoining ones of the minute recessed portions (the distance between a certain recessed portion and another one of the recessed portions which is closest to the certain recessed portion) was about 190 nm. The average value of the depth of the minute recessed portions was 200 nm. The average value of the aspect ratio of the minute recessed portions was 2.0. The maximum value, minimum value, and average value of the two-dimensional size of the minute recessed portions were 110 nm, 90 nm, and 100 nm, respectively. Note that the aspect ratio of the minute recessed portions refers to the ratio of the depth to the two-dimensional size (diameter) of the minute recessed portions.

As seen from FIGS. 4(b) to 4(e), the pseudo moth-eye molds 10A, 10B, 10C, and 10D have relatively large recessed portions (second recessed portions 14), and such large recessed portions are not observed in FIG. 4(a). As seen from FIGS. 4(b) to 4(e), the shape of the second recessed portions 14 (the shape when viewed in a direction normal to the surface of the pseudo moth-eye mold) was generally circular. The second recessed portions 14 had a plurality of minute recessed portions 15 over the inner surfaces such that the size of the minute recessed portions 15 was generally equal to that of the first recessed portions 12, although it is difficult to find them in FIGS. 4(b) to 4(e). The second recessed portions 14 were realized by forming the plurality of minute recessed portions 15 in the inner surfaces of the recessed portions formed by galvanic corrosion in the fabrication processes of the pseudo moth-eye molds 10A to 10D. As seen from FIGS. 4(b) to 4(e), the size of the second recessed portions 14 formed in the pseudo moth-eye molds 10A, 10B, 10C, and 10D increases in this order, and the number of the second recessed portions 14 formed in the pseudo moth-eye molds 10A, 10B, 10C, and 10D basically increases in this order. In each of the pseudo moth-eye molds 10A to 10D, the average value of the distance between adjoining ones of the plurality of first recessed portions 12 was 190 nm. The average value of the depth of the first recessed portions 12 was 200 nm. The average value of the aspect ratio of the first recessed portions 12 was 2.0. The maximum value, minimum value, and average value of the two-dimensional size of the first recessed portions 12 were 110 nm, 90 nm, and 100 nm, respectively.

To obtain the average size and occupied area (area ratio) of the second recessed portions 14 of the pseudo moth-eye molds 10A, 10B, 10C, and 10D, firstly, the distribution of the two-dimensional sizes of the second recessed portions 14 was examined from the SEM images of FIGS. 4(b) to 4(e). Among the recessed portions in the region shown in FIG. 4 which had two-dimensional size of not less than 190 nm, recessed portions which had the plurality of minute recessed portions 15 were employed as the second recessed portions 14. Table 1 shows the distributions of the two-dimensional sizes of the second recessed portions 14 in the range of 190 nm to 950 nm. As shown in Table 1, as for the two-dimensional size of the second recessed portions, the distributions over the nine ranges were examined. In Table 1, the "center value" refers to a value at the middle between the extreme values (the upper limit and the lower limit) of each of the nine ranges. FIGS. 5(a) to 5(d) show the histograms which represent the distributions of the two-dimensional sizes of the second recessed portions (Table 1) of the pseudo moth-eye molds 10A, 10B, 10C, and 10D, respectively.

TABLE 1

| Ranges of two-dimensional size (nm) | Center value (nm) | 10A | 10B | 10C | 10D |
|---|---|---|---|---|---|
| 190-250 | 220 | 15 | 11 | 1 | 1 |
| 250-300 | 275 | 28 | 12 | 6 | 4 |
| 300-350 | 325 | 14 | 17 | 3 | 4 |
| 350-450 | 400 | 0 | 10 | 13 | 22 |
| 450-550 | 500 | 0 | 0 | 9 | 25 |
| 550-650 | 600 | 0 | 0 | 3 | 34 |
| 650-750 | 700 | 0 | 0 | 4 | 28 |
| 750-850 | 800 | 0 | 0 | 1 | 19 |
| 850-950 | 900 | 0 | 0 | 0 | 8 |

As seen from Table 1 and FIGS. 5(a) to 5(d), in the fabrication processes of the pseudo moth-eye molds, as the etching duration of the first cycle of the etching step (the etching cycle where the etching was performed on an aluminum base with the aluminum base in the etching solution being in contact with an electrode which contains a metal whose standard electrode potential is higher than that of the aluminum base) increased, the resultant pseudo moth-eye mold had a greater number of second recessed portions which had large two-dimensional sizes. This is thought to be attributed to a phenomenon that, as will be described later in detail, as the etching duration increases, the amount of galvanic corrosion also increases.

The average size and occupied area (area ratio) of the second recessed portions were calculated using the distributions shown in Table 1. The results are shown in Table 2. In Table 2, "Number of Second Recessed Portions" refers to the total number of the second recessed portions 14 in the region shown in FIG. 4. The average size was obtained as described hereinafter. For each of the nine ranges shown in Table 1, the product of the center value and the number of the second recessed portions 14 in that range was calculated. The sum of all the products for the nine ranges was divided by "Number of Second Recessed Portions" which has been defined above, whereby the average size was obtained. The occupied area was calculated with the area of the second recessed portion in each of the ranges being replaced by the area of a circle whose diameter is equal to the center value of that range. Specifically, for each of the nine ranges, the product of the area of the circle and the number of the second recessed portions 14 in that range was calculated. The sum of the products was assigned as the occupied area. Meanwhile, the calculated occupied area was divided by the area of the region shown in FIG. 4 (462.5 $\mu m^2$), whereby the area ratio was calculated. Likewise, "Number of Second Recessed Portions" was divided by the area, whereby the surface density was calculated.

The results of measurement of the contact angle of the respective surfaces of the pseudo moth-eye molds 20A, 10A, 10B, 10C, and 10D are also shown in Table 2. In the measurement of the contact angle, an automatic static contact angle meter named DropMaster, manufactured by Kyowa Interface Science Co., Ltd., was used to evaluate the contact angle for water of a surface coated with a fluoric mold releasing agent. The fluoric mold releasing agent is typically applied over the surface of the moth-eye mold in the case where an antireflection film is fabricated using a photocurable resin. The mold releasing agent used herein was a fluoric mold releasing agent whose contact angle for a naturally-oxidized aluminum film is 110°.

FIGS. 6(a), 6(b), 6(c), and 6(d) show the relationships of the contact angle to the average size, occupied area, area ratio, and surface density of the second recessed portions 14 of the pseudo moth-eye molds 10A, 10B, 10C, and 10D, respectively, by solid circles (●). Note that in FIGS. 6(a) to 6(d) the relationship for the pseudo moth-eye mold 20A is also shown by solid circles (●), although each of the average size, occupied area, area ratio, and surface density is zero (0) because the pseudo moth-eye mold 20A does not have the second recessed portions.

TABLE 2

|  | 20A | 10A | 10B | 10C | 10D |
|---|---|---|---|---|---|
| Contact Angle | 140.5° | 133.4° | 131.9° | 128.9° | 124.9° |
| Etching Duration (min) | 90 | 50 | 60 | 70 | 80 |
| Average Size of Second Recessed Portions (nm) | — | 273 | 305 | 449 | 595 |
| Occupied Area of Second Recessed Portions ($\mu m^2$) | 0 | 3.39 | 3.80 | 6.93 | 43.31 |
| Area Ratio (%) | 0 | 0.7 | 0.8 | 1.5 | 9.4 |
| Number of Second Recessed Portions (counts/462.5 $\mu m^2$) | 0 | 57 | 50 | 40 | 145 |
| Surface Density (counts/$\mu m^2$) | 0 | 0.123 | 0.108 | 0.086 | 0.314 |

As seen from Table 2, the contact angle for water of the pseudo moth-eye mold 20A was 140.5°, which was greater than the contact angle on the naturally-oxidized aluminum film, 110°. This is thought to be because water did not reach the bottoms of the minute recessed portions formed in the surface of the pseudo moth-eye mold 20A.

The contact angle of the pseudo moth-eye mold 10A that had the second recessed portions whose average size was 273 nm was 133.4°, which was smaller than the contact angle of the pseudo moth-eye mold 20A by 7.1°. Thus, in the case of the recessed portions whose average size is 273 nm, water can reach the bottoms of the recessed portions. It is appreciated that the recessed portions serve to decrease the contact angle for water of the pseudo moth-eye mold 10A.

Figure 6:
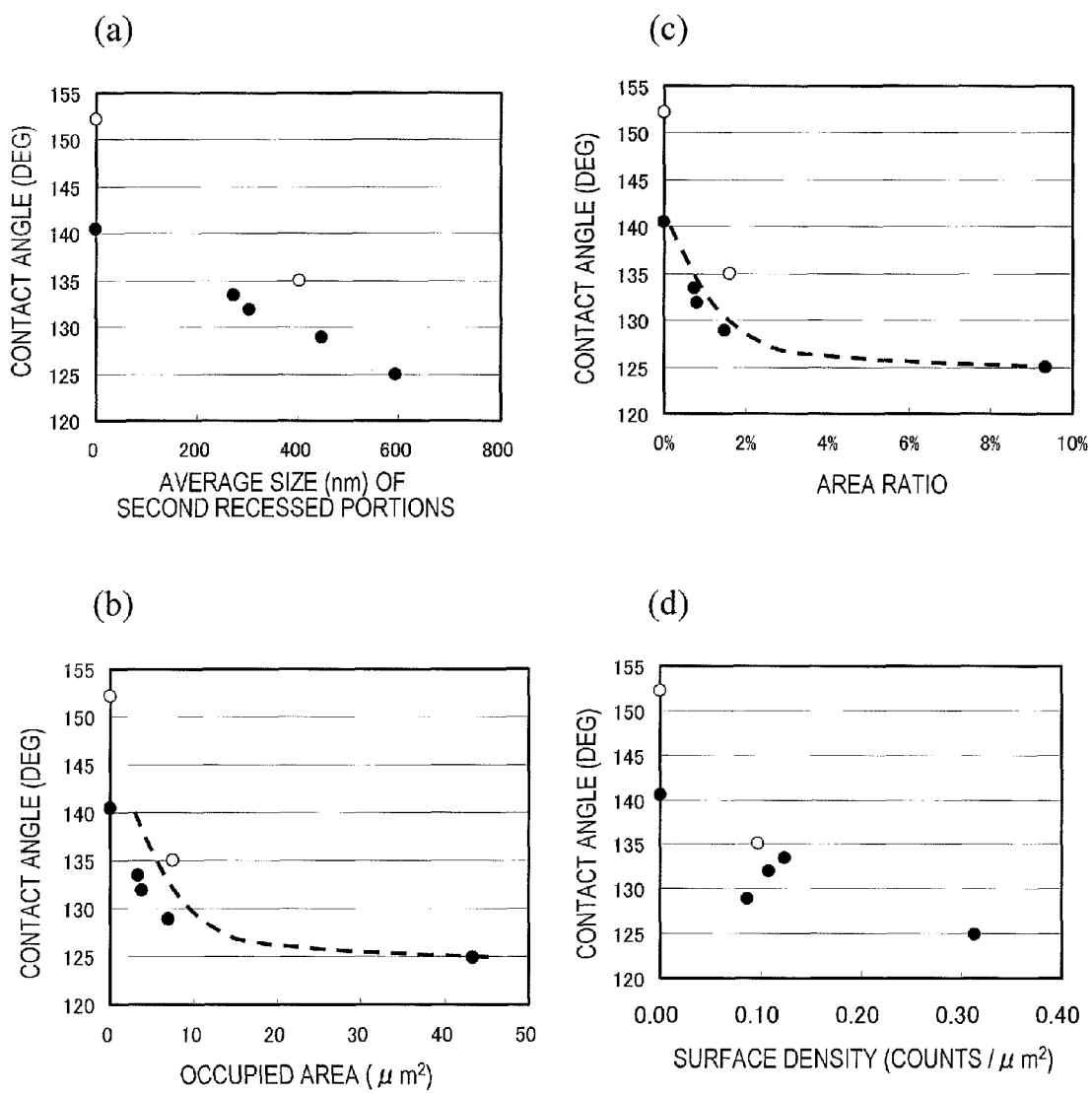
FIGS. 6(a), (b), (c), and (d) are graphs which show the largeness of the contact angle with respect to the average size, occupied area, area ratio, and surface density of the second recessed portions of a pseudo moth-eye mold (●) and the largeness of the contact angle with respect to the average size, occupied area, area ratio, and surface density of the second recessed portions of a moth-eye mold (○).

It is clearly seen from the results of the pseudo moth-eye molds 10A, 10B, 10C, and 10D that, as the average size of the second recessed portions increases while the area ratio of the second recessed portions increases, the contact angle decreases (Table 2, FIG. 6(a), FIG. 6(c)). From this tendency, it is appreciated that the mechanism which has previously been described using the Cassie's formula (formula (2)) is correct. The average sizes of the first recessed portions and the second recessed portions of the pseudo moth-eye mold 10A were 100 nm and 273 nm, respectively. Therefore, in the pseudo moth-eye mold 10A, the average size of the second recessed portions was 2.73 times the average size of the first recessed portions. Thus, when the average size of the second recessed portions is not less than 2.73 times the average size of the first recessed portions and the area ratio of the second recessed portions is at least not less than 0.7%, the contact angle can be reduced by 7.1° or more. Note that the correlation between the number (surface density (counts/$\mu m^2$)) of the second recessed portions and the contact angle was small.

The present inventors fabricated the moth-eye mold 10 and measured the contact angle. The result of the measurement will be described below.

The moth-eye mold 10 was fabricated as described below.

Firstly, an aluminum base was anodized to form an anodized layer (porous alumina layer). The anodization step was performed for 1 minute with the applied voltage at 80 V using oxalic acid (concentration: 0.05 mol/L, solution temperature: 5° C.).

Then, the etching was performed with an electrode which is made of an aluminum alloy containing Cu, Fe, Si, Zn, or the like, being in contact with the aluminum base, whereby the plurality of recessed portions (recessed portions 17 shown in FIG. 8(b)) were formed. The etching step was performed for 80 minutes using phosphoric acid (concentration: 1 mol/L, solution temperature: 30° C.). Thereafter, the usual etching was performed for 10 minutes, whereby the anodized layer was removed.

Then, the anodization step and the usual etching step were alternately performed through 5 cycles (including 5 cycles of the anodization step and 4 cycles of the etching step). As a result, the moth-eye mold 10 was obtained. The anodization was performed for 25 seconds under the same conditions as those described above. The etching was performed for 25 minutes using the same etching solution as that described above, with the electrode being kept separate.

On the other hand, for the sake of comparison, a moth-eye mold 20B was fabricated which did not have the second recessed portions. In the first place, the anodization was performed to form an anodized layer, and then, the usual etching was performed to remove the anodized layer. Subsequently, the anodization step and the usual etching step were alternately performed through 5 cycles (including 5 cycles of the anodization step and 4 cycles of the etching step). As a result, the moth-eye mold 20B was obtained which did not have the second recessed portions. In the fabrication process of the moth-eye mold 20B, the anodization conditions for the first cycle of the anodization step and the etching conditions for the first cycle of the etching step were respectively the same as the conditions for the first cycle of the anodization step and the conditions for the first cycle of the etching step in the fabrication process of the pseudo moth-eye mold 20A. Also, in the fabrication process of the moth-eye mold 20B, the anodization conditions for the second and subsequent cycles of the anodization step and the etching conditions for the second and subsequent cycles of the etching step were respectively the same as the conditions for the second and subsequent cycles of the anodization step and the conditions for the second and subsequent cycles of the etching step in the fabrication process of the moth-eye mold 10.

Figure 5:
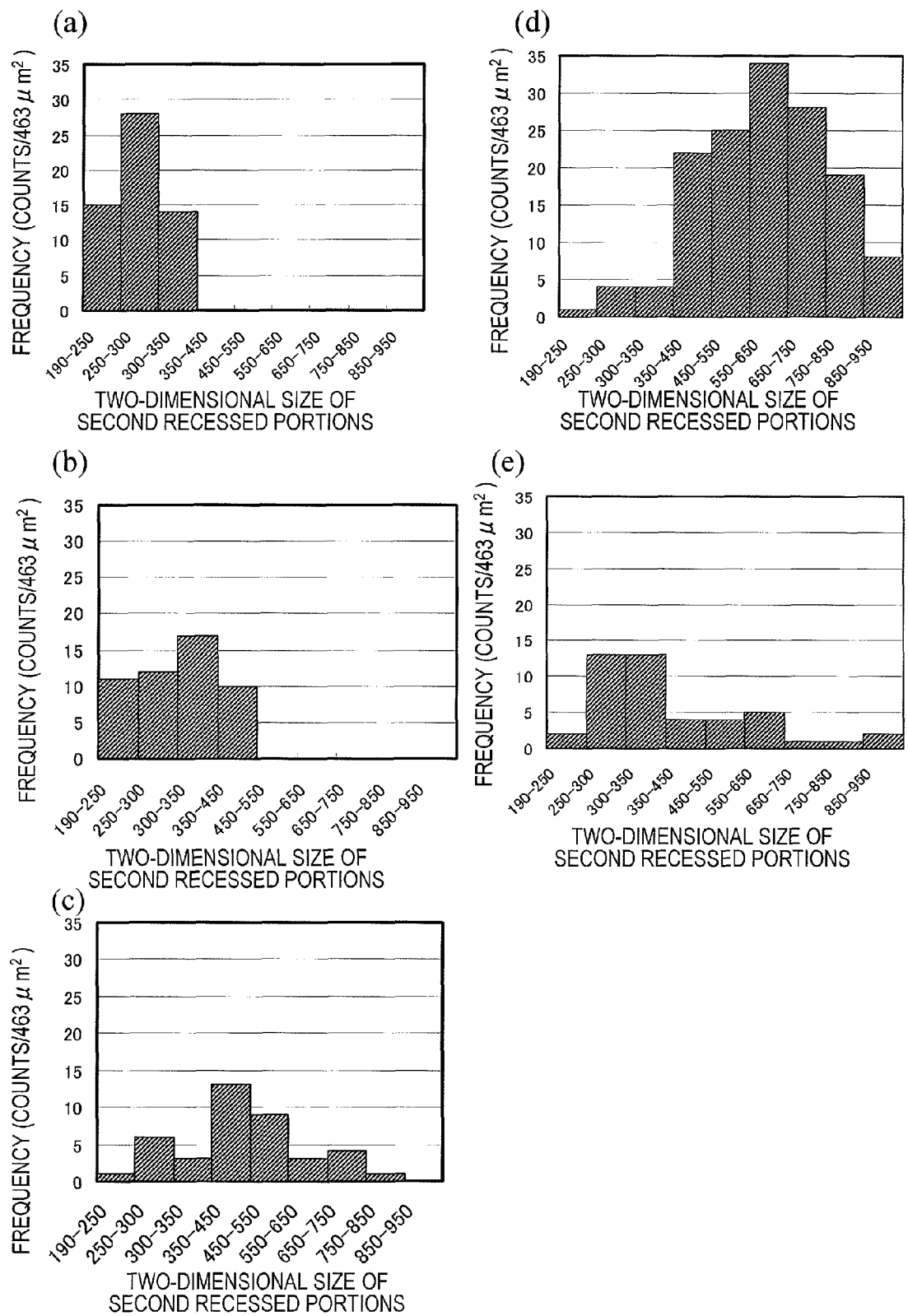
FIGS. 5(a), (b), (c), (d), and (e) are histograms which represent the distributions of the two-dimensional sizes of the second recessed portions of pseudo moth-eye molds 10A, 10B, 10C, and 10D and the moth-eye mold 10, respectively.
Figure 7:
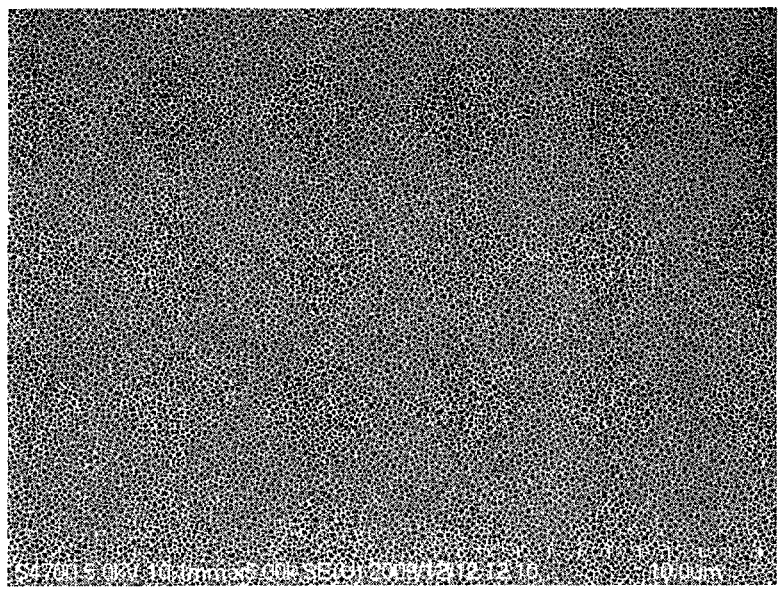
FIGS. 7(a) and (b) show SEM images of the surfaces of a moth-eye mold 20B and the moth-eye mold 10, respectively.
Figure 7:
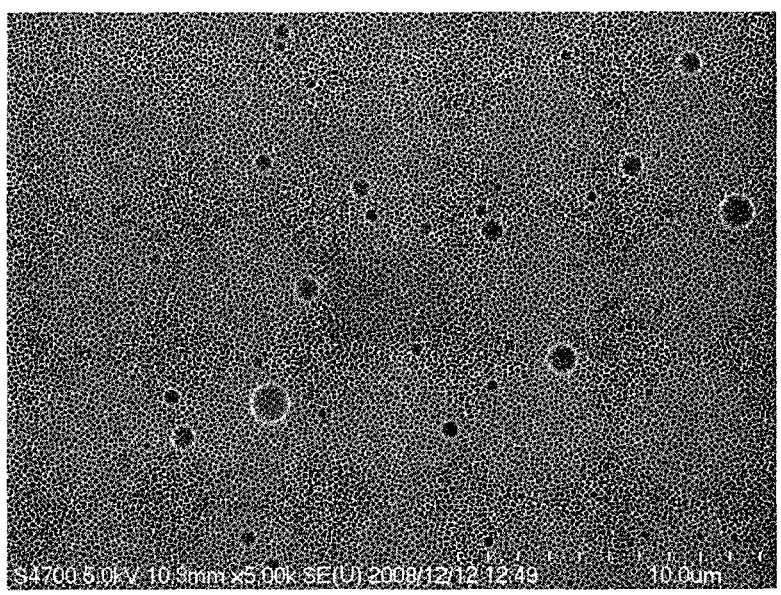

FIG. 7(a) shows a SEM image of the moth-eye mold 20B that does not have the second recessed portions. FIG. 7(b) shows a SEM image of a surface of the moth-eye mold 10 that has the second recessed portions. Table 3 shows the distribution of the two-dimensional sizes of the second recessed portions of the moth-eye mold 10, which was obtained in the same way as the data of Table 1. FIG. 5(e) shows the histogram which represents the distribution of the two-dimensional sizes of the second recessed portions of the moth-eye mold 10 (Table 3).

TABLE 3

| Ranges of two-dimensional size (nm) | Center value (nm) | Moth-eye mold 10 |
|---|---|---|
| 190-250 | 220 | 2 |
| 250-300 | 275 | 13 |
| 300-350 | 325 | 13 |
| 350-450 | 400 | 4 |
| 450-550 | 500 | 4 |
| 550-650 | 600 | 5 |
| 650-750 | 700 | 1 |
| 750-850 | 800 | 1 |
| 850-950 | 900 | 2 |

As seen from FIG. 7(a), the surface of the moth-eye mold 20B has minute recessed portions (micropores) which are formed generally uniformly over the entire surface. The distribution of the minute recessed portions has no regularity. The minute recessed portions of the moth-eye mold 20B are formed through a plurality of cycles of the etching step and are therefore greater than the minute recessed portions formed in the surface of the pseudo moth-eye mold 20A (FIG. 4(a)).

On the other hand, the surface of the moth-eye mold 10 has relatively large recessed portions (second recessed portions 14) as seen from FIG. 7(b). The two-dimensional size of the second recessed portions 14 was not less than 220 nm and not more than 900 nm. The average size (the average value of the two-dimensional size) of the second recessed portions was 403 nm. The two-dimensional sizes of the second recessed portions 14 of the moth-eye mold 10 were widely distributed over the ranges from 220 nm to 900 nm. The largest number of second recessed portions were found in the range of not less than 250 nm and not more than 350 nm (FIG. 5(e), Table 3). Provided between the plurality of second recessed portions 14 were the plurality of first recessed portions 12. Provided over the inner surfaces of the plurality of second recessed portions 14 were the plurality of minute recessed portions 15. In the region shown in FIG. 7(b), the number of the second recessed portions included was 45. The occupied area of the second recessed portions which was calculated from Table 3 was 7.47 $\mu m^2$. The number of the second recessed portions was divided by the area of the region shown in FIG. 7(b) (462.5 $\mu m^2$), whereby the surface density was calculated at 0.097/$\mu m^2$. Likewise, the occupied area of the second recessed portions was divided by the area of the region shown in FIG. 7(b), whereby the area ratio was calculated at 1.6%. The average value of the distance between adjoining ones of the plurality of first recessed portions of the moth-eye mold 10 (FIG. 7(b)) was 180 nm. The average value of the depth of the plurality of first recessed portions was 380 nm. The average value of the aspect ratio of the plurality of first recessed portions was 2.11. The maximum value, minimum value, and average value of the two-dimensional size of the first recessed portions were 190 nm, 170 nm, and 180 nm, respectively.

The contact angles of the moth-eye mold 20B and the moth-eye mold 10 were measured in the same way as the pseudo moth-eye molds 10A to 10D and 20A. Specifically, the contact angles for water of the moth-eye mold 20B and the moth-eye mold 10 which were provided with a mold release treatment were measured. The largeness of the contact angle with respect to the average size, occupied area, area ratio, and surface density of the second recessed portions is shown by open circles (○) in FIGS. 6(a) to 6(d). Note that in FIGS. 6(a) to 6(d) the data for the moth-eye mold 20B are also shown by open circles (○), although each of the average size, occupied area, area ratio, and surface density is zero (0) because the moth-eye mold 20B does not have the second recessed portions. The contact angle of the moth-eye mold 20B that did not have the second recessed portions was 152.2°. The contact angle of the moth-eye mold 10 that had the second recessed portions was 135.0°. Specifically, since the moth-eye mold 10 has the second recessed portions as described above, the contact angle of the moth-eye mold 10 is smaller than the contact angle of the moth-eye mold 20B by 17.2°.

As seen from FIG. 6(b), in the pseudo moth-eye mold (●), as the area ratio of the second recessed portions increased, the contact angle decreased. According to the mechanism which has previously been described using formula (2), in principle, the contact angle is smallest when the area ratio is 100%.

It is inferred that, in the case of the moth-eye mold, the relationship between the area ratio of the second recessed portions and the contact angle has a similar tendency to that of the pseudo moth-eye mold. Specifically, it is inferred that, even in the moth-eye mold, the contact angle decreases as the area ratio of the second recessed portions increases. Note that, as will be described later, raised portions which are obtained by inverting the second recessed portions can perform the antiglare function. From the viewpoint of the antiglare function, it is preferred that the area ratio of the second recessed portions is not less than 0.8%.

The area ratio of the second recessed portions can be adjusted by modifying the etching conditions as will be described later. Alternatively, the area ratio of the second recessed portions can also be adjusted by altering the concentration of a metal of a different type in the electrode or the aluminum base used in the first cycle of the etching step (the etching cycle where the etching is performed on an aluminum base with the aluminum base in the etching solution being in contact with an electrode which contains a metal whose standard electrode potential is higher than that of the aluminum base).

Next, a preferred range of the contact angle of the moth-eye mold 10 is described. If the contact angle is large, air is trapped between the curable resin and a work to which the moth-eye structure is to be transferred, so that the structure is not successfully transferred in some portions. If the contact angle is excessively small, the mold releasability deteriorates. By varying surface states of the mold releasing agent employed to form a coat over the surface, six mold samples whose contact angle for water was 7°, 60°, 100°, 120°, 140°, and 150° were fabricated. These samples were examined as to whether or not the mold releasability was sufficient and as to whether or not there was a portion where formation of the moth-eye structure failed. Firstly, six moth-eye mold samples were fabricated according to the same method as the above-described fabrication process of the moth-eye mold 20B. All the six mold samples were fabricated under the same conditions. Therefore, among the six mold samples, the distribution of the two-dimensional sizes of the micropores formed in the surface (inverted moth-eye structure) was generally equal.

Five out of the resultant six moth-eye mold samples were provided with a fluoric mold releasing agent over the surface. The fluoric mold releasing agent was the same as that described above. The remaining one moth-eye mold sample was not provided with a fluoric mold releasing agent. Thereafter, the surface of the moth-eye mold which was coated with the fluoric mold releasing agent was irradiated with light at the wavelength of 200 nm to 500 nm using a UV lamp system manufactured by Fusion UV Systems Japan KK. The UV dose was varied among five values, 0 J/cm$^2$, 10 J/cm$^2$, 120 J/cm$^2$, 400 J/cm$^2$, and 800 J/cm$^2$. In this way, the six moth-eye mold samples with different surface states were obtained.

The mold releasability was evaluated by examining the peeling strength of a cured layer of a UV-curable resin applied over the surfaces of the six moth-eye mold samples. The results are shown in Table 4. In Table 4, ⊚ means that the cured resin layer was very readily peeled off by a small peeling force, ○ means that the cured resin layer was sufficiently peeled off, Δ means that the cured resin layer was peeled off by a large peeling force, and X means that the cured resin layer was not completely peeled off with some part of the UV-curable resin remaining on the mold surface. Meanwhile, an antireflection film (with an area of 0.01 m$^2$) was formed using the photocurable resin, and the frequency of occurrence of portions in which formation of the moth-eye structure failed (defect portions) was visually evaluated. In Table 4, ○ means that no defect portion was detected, Δ means that there were a small number of defect portions, and X means that there were a large number of defect portions (approximately not less than 300 counts/m$^2$).

TABLE 4

| Contact Angle | 7° | 60° | 100° | 120° | 140° | 150° |
|---|---|---|---|---|---|---|
| Mold Releasability | X | Δ | ○ | ⊚ | ⊚ | ⊚ |
| Occurrence of Defect Portions | X | X | Δ | ○ | ○ | Δ |

It is appreciated from Table 4 that, from the viewpoint of mold releasability, the contact angle is preferably not less than 100°. To prevent occurrence of a portion in which formation of the moth-eye structure fails, the contact angle is preferably not less than 120° and not more than 140°. Therefore, the contact angle of the moth-eye mold is preferably not less than 120° and not more than 140°.

In the cases of the moth-eye mold with a contact angle of 7° and the moth-eye mold with a contact angle of 60°, i.e., in the cases of the moth-eye molds that exhibit relatively high wettability, it is inferred from the evaluation results of the mold releasability that the cause of occurrence of defect portions is high adhesion between the UV-curable resin and the moth-eye mold. On the other hand, in the case of the moth-eye mold with a contact angle of 150° which exhibits relatively low wettability, it is inferred that the cause of occurrence of defect portions is intervention by trapped air in the transfer step due to a great difference in wettability for the UV-curable resin between the mold and the work to which the moth-eye structure is to be transferred.

As seen from this result, in the case where the contact angle of the surface of the moth-eye mold is controlled by forming the second recessed portions, the size and area ratio of the second recessed portions are adjusted such that the contact angle is not less than 120° and not more than 140°, whereby a moth-eye mold with improved wettability for the curable resin can be obtained.

The above-described moth-eye mold 10 has a contact angle of 135° and is therefore preferred from both the viewpoint of mold releasability and the viewpoint of preventing occurrence of defect portions.

Next, a method of fabricating the moth-eye mold 10 according to an embodiment of the present invention is described. In an example described herein, the aluminum base is used. However, the method of fabricating the moth-eye mold 10 according to an embodiment of the present invention is also applicable to an aluminum film which is formed on a base (e.g., glass substrate) using a thin film deposition technique.

The mold fabrication method of an embodiment of the present invention includes, as shown in FIGS. 8(a) to 8(c), the step of providing an aluminum base 11 with the purity of not less than 99.5 mass % (FIG. 8(a)), the step of etching the aluminum base 11 with a surface of the aluminum base 11 in the etching solution being in contact with a metal whose standard electrode potential is higher than that of the aluminum base 11, thereby forming a plurality of recessed portions 17 whose two-dimensional size is not less than 190 nm and not more than 50 μm (FIG. 8(b)), and the step of anodizing the surface of the aluminum base 11 to form a porous alumina layer over the inner surfaces of the plurality of recessed portions 17 and between the plurality of recessed portions 17, thereby forming the plurality of first recessed portions 12 and the plurality of second recessed portions 14 (FIG. 8(c)). According to the mold fabrication method of the embodiment of the present invention, a moth-eye mold 10 (FIG. 1) is obtained which includes an anodized porous alumina layer over its surface and which has a plurality of second recessed portions 14 and a plurality of first recessed portions 12. When viewed in a direction normal to the surface, the plurality of second recessed portions 14 have a two-dimensional size of not less than 190 nm and not more than 50 μm. The inner surfaces of the second recessed portions 14 have a plurality of minute recessed portions 15 whose two-dimensional size is not less than 10 nm and not more than 200 nm. The plurality of first recessed portions 12 have a two-dimensional size of not less than 10 nm and not more than 200 nm. The plurality of first recessed portions are provided between the plurality of second recessed portions 14. Hereinafter, the moth-eye mold fabrication method of the embodiment of the present invention is described with reference to FIGS. 8(a) to 8(d).

First, as shown in FIG. 8(a), an aluminum base 11 is provided in which the aluminum content is not less than 99.5 mass %.

Then, as shown in FIG. 8(b), an etching is performed on the aluminum base 11 with the aluminum base 11 in the etching solution being in contact with an electrode (not shown) that is made of an aluminum alloy which contains a metal whose standard electrode potential is higher than that of the aluminum base 11, whereby recessed portions 17 are formed. As well known in the art, when metals of different standard electrode potentials are immersed in an electrolytic solution with the metals being kept in contact with each other, a potential difference occurs between one of the metals which has a higher standard electrode potential (more noble metal) and the other metal which has a lower standard electrode potential (less noble metal) so that a cell is formed and an electric current flows therebetween. As a result, the less noble metal corrodes (galvanic corrosion). The etching is performed on the aluminum base 11 with the aluminum base 11 in the etching solution being in contact with an electrode that is made of an aluminum alloy which contains a metal whose standard electrode potential is higher than that of the aluminum base 11, whereby galvanic corrosion is caused so that the aluminum base side corrodes. As a result, the recessed portions 17 are formed.

In the first cycle of the etching step, the electrode that is to be brought into contact with the aluminum base may be made of an aluminum alloy which contains, for example, Cu, Fe, Si, Zn, or the like. Examples of the metal of a different type which has a higher standard electrode potential than aluminum include, for example, Zn, Fe, Ni, Sn, Pb, Cu, Hg, Ag, Pt, and Au.

Note that, before the above-described etching step, the aluminum base 11 may be anodized partially (in a surface portion) under predetermined conditions, whereby an anodized layer (for example, a porous alumina layer which has a plurality of micropores) is formed. Thereafter, in the etching step, the initially-formed porous alumina layer may be dissolved away when necessary. This is because there is a probability that the initially-formed porous alumina layer has defects due to the initial state of the surface of the aluminum base or due to impurities contained in the aluminum base. The thickness of the porous alumina layer that is initially formed and dissolved away is preferably not less than 200 nm from the viewpoint of reproducibility, and is preferably not more than 2000 nm from the viewpoint of productivity. As a matter of course, when necessary, the initially-formed porous alumina layer may be removed partially (e.g., from the surface to a certain depth). The removal of the porous alumina layer may be realized by a known method, for example, by immersing the layer in a phosphoric acid aqueous solution or chromium phosphate aqueous solution for a predetermined period of time.

The initially-formed anodized layer may also be partially removed by performing the etching with the aluminum base being in contact with the electrode such as described above. When the anodized layer is further removed after the etching that is to be performed with the aluminum base being in contact with the electrode, for example, the usual etching may be performed with the electrode being kept disconnected. Part of the anodized layer which is to be removed by the etching can be adjusted by modifying the etching conditions of the etching step. For example, the thickness of part of the anodized layer which is to be removed by the etching can be adjusted by altering the etching duration of the usual etching step.

Thereafter, as shown in FIG. 8(c), the aluminum base 11 is partially anodized such that a porous alumina layer which has a plurality of micropores (minute recessed portions) is formed over the inner surfaces of the plurality of recessed portions 17 and between the plurality of recessed portions 17. In this way, the second recessed portions 14 that have the plurality of minute recessed portions 15 over the inner surfaces are formed, and the plurality of first recessed portions 12 are formed between the plurality of second recessed portions 14. Note that, as described above, micropores of the porous alumina layer which are formed between the plurality of recessed portions 17 are referred to as "first recessed portions 12", and the other micropores of the porous alumina layer (micropores of the porous alumina layer which are formed in the inner surfaces of the plurality of recessed portions 17) are referred to as "minute recessed portions 15".

Thereafter, when necessary, the usual etching step may be performed to increase the pore diameters of the first recessed portions 12 and the minute recessed portions 15. Specifically, as shown in FIG. 8(d), the porous alumina layer is exposed to an alumina etchant so as to be further etched, whereby the pore diameters of the first recessed portions 12 and the minute recessed portions 15 are increased. Note that the etching solution used herein may be the same as the etching solution used in the first cycle of the etching step. In practice, the same etching bath may be used.

Thereafter, when necessary, the aluminum base 11 is further partially anodized such that the first recessed portions 12 and the minute recessed portions 15 are grown. Here, the growth of the first recessed portions 12 and the minute recessed portions 15 starts at the bottoms of the previously-formed first recessed portions 12 and minute recessed portions 15, and accordingly, the lateral surfaces of the first recessed portions 12 and the minute recessed portions 15 have stepped shapes. Note that, however, as will be described later, the lateral surfaces of the first recessed portions 12 and the minute recessed portions 15 may have smooth surfaces depending on the conditions for the anodization and/or the etching.

Thereafter, when necessary, the above-described anodization step and etching step are further repeated, whereby the moth-eye mold 10 (FIG. 1) is obtained.

FIG. 7(b) shows a SEM image of a surface of the moth-eye mold 10. The moth-eye mold 10 was fabricated according to the above-described method under the conditions described below. The first cycle of the anodization step was performed for 1 minute with the applied voltage at 80 V using oxalic acid (concentration: 0.05 mol/L, solution temperature: 5° C.). The first cycle of the etching step was performed for minutes using phosphoric acid (concentration: 1 mol/L, solution temperature: 30° C.). An aluminum alloy containing Cu, Fe, Si, Zn, or the like, was used as the electrode and brought into contact with the aluminum base. Thereafter, the usual etching was performed for 10 minutes under the same etching conditions, whereby the anodized layer formed in the first cycle of the anodization was completely removed. The second and subsequent cycles of the anodization step were performed for 25 seconds under the same conditions as those of the first cycle. The second and subsequent cycles of the etching step were performed for 25 minutes using the same etching solution as that used in the first cycle.

If the descending angle α of the inner surfaces of the second recessed portions 14 relative to the surface of the mold is greater than 0°, the effect of decreasing the contact angle can be achieved. The descending angle α of the second recessed portions 14 is preferably not more than 90°. This is because, if the descending angle α is greater than 90°, such a large descending angle is not preferred from the viewpoint of the mold releasability in manufacturing an antireflection film.

The two-dimensional size (average size), number (surface density), and occupied area (area ratio) of the second recessed portions 14 can be adjusted by modifying the etching conditions. For example, as previously described with reference to FIGS. 4(b) to 4(e), Table 1, and Table 2, the two-dimensional size (average size), number (surface density), and occupied area (area ratio) of the second recessed portions can be adjusted by altering the etching duration. Also, as will be described later, the progress of galvanic corrosion is affected by the etching duration as well as by the concentration of a metal of a different type in the electrode or the aluminum base, for example. Therefore, it is inferred that the two-dimensional size (average size), number (surface density), and occupied area (area ratio) of the second recessed portions can be controlled by altering, for example, the concentration of a metal of a different type in the electrode or the aluminum base.

In the process of repeating the above-described anodization and etching, the lateral surfaces of the first recessed portions 12 can be controlled to have various shapes, varying from stepped lateral surfaces to substantially smooth lateral surfaces, by controlling the process amount in respective cycles of the anodization step and the etching step or the number of cycles of the anodization step and the etching step. Furthermore, by varying the anodization process amount and the etching process amount in respective cycles of repetition of the steps, the lateral surface can have a shape such that its slope becomes more moderate as the position moves from the bottom point of the first recessed portion 12 toward the mold surface, or a shape such that its slope becomes steeper as the position moves from the bottom point of the first recessed portion 12 toward the mold surface. Also, the first recessed portions 12 realized by utilizing the micropores of the porous alumina layer can have an arrangement which has high regularity (which has periodicity) under a certain condition that, for example, periodic start points are provided. Alternatively, by modifying the process conditions, an arrangement which has regularity disturbed to some extent, or an irregular arrangement (which has no periodicity), may be achieved. An antireflection film which has a moth-eye structure of irregular arrangement has advantages that generation of diffracted light which would deteriorate visibility can be prevented and that a high antireflection performance can be achieved, in contrast to an antireflection film which has a moth-eye structure that has regularity. The irregular arrangement (which has no periodicity) of the plurality of first recessed portions 12 means that, for example, the distance between the bottom point of a certain one of the plurality of first recessed portions and the bottom point of another one of the first recessed portions which is closest to the bottom point of the certain first recessed portion is different from the distance between the bottom point of another certain one of the plurality of first recessed portions and the bottom point of still another one of the first recessed portions which is closest to the bottom point of the another certain first recessed portion. The shape and arrangement of the plurality of minute recessed portions 15 formed in the inner surfaces of the second recessed portions 14 can also be controlled in the same way as the first recessed portions 12.

As described above, by altering the etching duration of the first cycle of the etching step, the two-dimensional size (average size), number (surface density), and occupied area (area ratio) of the second recessed portions 14 can be adjusted. This respect is now described with reference to Table 1 and Table 2 shown above and FIGS. 4(b) to 4(e). As described above, FIGS. 4(b) to 4(e) show SEM images of surfaces of the pseudo moth-eye molds 10A, 10B, 10C, and 10D that were fabricated with varying etching durations of the first cycle of the etching step (the step of etching the aluminum base with the aluminum base in the etching solution being in contact with an electrode that contains a metal whose standard electrode potential is higher than that of the aluminum base), 50 minutes, 60 minutes, 70 minutes, and 80 minutes, respectively. Table 1 shows the distributions of the two-dimensional sizes of the second recessed portions 14 in the region shown in FIG. 4 of the pseudo moth-eye molds 10A, 10B, 10C, and 10D. Table 2 shows the average size, occupied area, area ratio, number, and surface density of the second recessed portions 14 in the region shown in FIG. 4 of the pseudo moth-eye molds 10A, 10B, 10C, and 10D.

As seen from Table 2, as the etching duration increased, the average size and occupied area (area ratio) of the second recessed portions 14 increased. This can probably be explained as follows. The second recessed portions 14 were realized by forming the minute recessed portions 15 in the inner surfaces of the recessed portions 17 that were formed by galvanic corrosion. Here, the amount of galvanic corrosion depends on the current integral value. As the etching duration increases, the amount of galvanic corrosion also increases. Since the occupied area of the plurality of recessed portions 17 increases as the amount of galvanic corrosion increases, it is therefore inferred that the occupied area (area ratio) of the plurality of recessed portions 17 increased as the etching duration increased. In other words, it is inferred that, as the etching duration increased, the occupied area (area ratio) of the second recessed portions 14 also increased. Since the amount of galvanic corrosion increases as the etching duration increases, it is inferred that, as the etching duration increased, the second recessed portions 14 also increased. Thus, it is inferred that, as the etching duration increased, the two-dimensional size and average size of the second recessed portions 14 also increased.

As the etching duration increased, the number (surface density) of the second recessed portions 14 generally increased. This respect can be explained as follows. In the fabrication processes of the pseudo moth-eye molds 10A, 10B, 10C, and 10D, before the first cycle of the etching step (the step of etching the aluminum base with the aluminum base in the etching solution being in contact with an electrode that contains a metal whose standard electrode potential is higher than that of the aluminum base), the anodization step was performed such that a porous alumina layer was formed over the surface of the aluminum base. The galvanic corrosion starts at a point in time where the etching solution comes in contact with aluminum lying under the porous alumina layer. There is a barrier layer at the bottom of the micropores of the porous alumina layer. When the etching step is performed, the thickness of the barrier layer decreases. Thereafter, the entire barrier layer is dissolved away, so that the etching solution comes in contact with aluminum, and the galvanic corrosion progresses. As a result, the recessed portions 17 are formed. The barrier layer of the porous alumina layer has a varying thickness. Therefore, the time required for dissolving away the entire barrier layer varies with the place. The galvanic corrosion progresses earlier in a micropore from which the barrier layer has been dissolved away. It is inferred that, as the etching duration increases, the number of micropores increases in which the entire barrier layer is dissolved away so that the galvanic corrosion can progress, and accordingly, the number of the recessed portions 17 increases. Since the second recessed portions 14 are realized by forming the plurality of minute recessed portions 15 in the recessed portions 17, it is inferred that, as the etching duration increases, the number (surface density) of the second recessed portions 14 increases. That is why the pseudo moth-eye mold 10D, which was fabricated with the longest etching duration, had the largest number (surface density) of the second recessed portions 14.

It is inferred that, when the etching is performed without initially forming an anodized layer, in forming the plurality of recessed portions 17 in the surface of the aluminum base, as the etching duration increases, the number of places in which the galvanic corrosion progresses increases. In this case also, it is inferred that, as the etching duration increases, the number (surface density) of the second recessed portions 14 increases.

The pseudo moth-eye molds 10A, 10B, and 10C, in this order, have decreasing numbers (surface densities) of the second recessed portions 14, i.e., as the etching duration increases. This is within the extent of minor errors. The galvanic corrosion progresses earlier in portions which are more susceptible to the etching due to the distribution of impurities in the aluminum base or the difference in crystal state of the aluminum base. It is inferred that, when the etching is performed after the formation of the porous alumina layer such that the recessed portions 17 are formed as in the fabrication processes of the pseudo moth-eye molds 10A, 10B, 10C, and 10D, the positions in which the recessed portions 17 are formed (i.e., the positions where the galvanic corrosion progresses) are affected by the impurity distribution in the aluminum base and the crystal state of the aluminum base. In the cases of the pseudo moth-eye molds 10A, 10B, and 10C, as the etching duration increased, the number (surface density) of the second recessed portions 14 decreased. This is thought to be attributed to the impurity distribution and the difference in crystal state in the aluminum base used in the fabrication of the moth-eye molds 10A to 10C.

Next, the lower limit of a preferred range of the descending angle α of the second recessed portions 14 is described.

For example, when the average value of the two-dimensional size of the second recessed portions is 403 nm as in the above-described moth-eye mold 10, the descending angle of the inner surfaces of the second recessed portions is preferably not less than 44.3° as will be described below.

Hereinafter, how to calculate the lower limit of the preferred range of the descending angle of the inner surfaces of the second recessed portions 14 is described with reference to FIG. 9 to FIG. 12. In the description below, for the sake of simplicity, it is assumed that, in the fabrication process of the moth-eye mold 10, the shape of the inner surfaces of the recessed portions 17 (FIG. 8(b)) formed in the first cycle of the etching step (the step of etching the aluminum base with the aluminum base in the etching solution being in contact with an electrode that contains a metal whose standard electrode potential is higher than that of the aluminum base) is part of a spherical surface. That is, it is assumed that the second recessed portions 14 are realized by forming the plurality of minute recessed portions 15 in the inner surfaces of recessed portions whose shape is part of a spherical surface. In the researches conducted by the present inventors, it was confirmed that the inverted moth-eye structure can be approximately assumed as a structure formed by an array of a plurality of conical protrusions. Therefore, in the description provided below, it is assumed that, in portions in which the plurality of minute recessed portions 15 formed in the inner surfaces of the second recessed portions 14 and the first recessed portions 12 are provided, a plurality of conical protrusions are provided.

Figure 9:
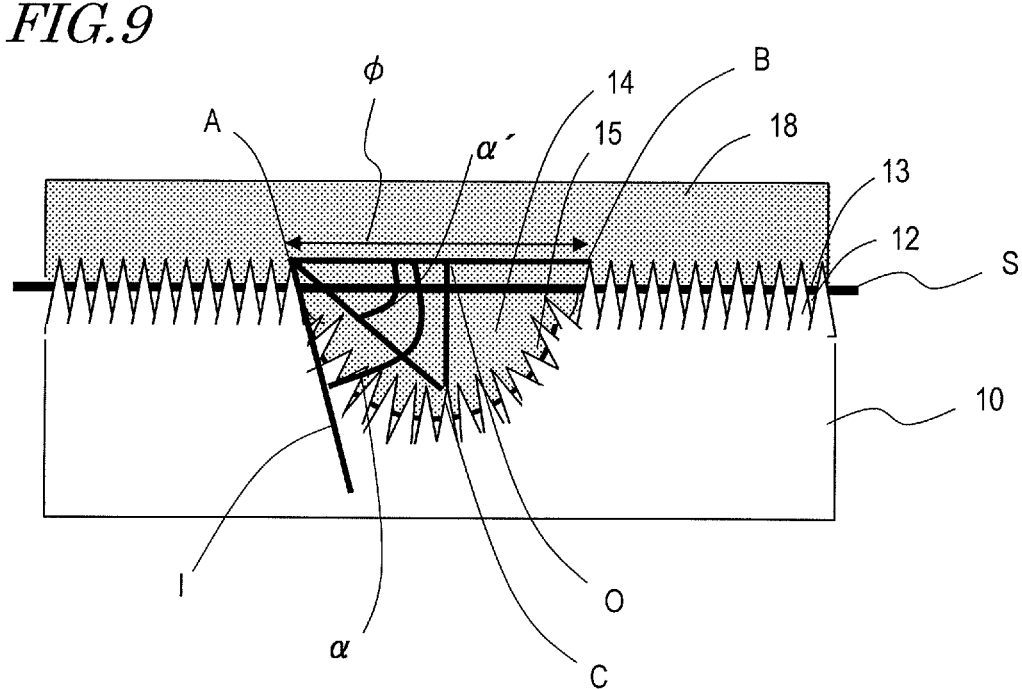
FIG. 9 A schematic cross-sectional view of a second recessed portion 14 and its surroundings.
Figure 10:
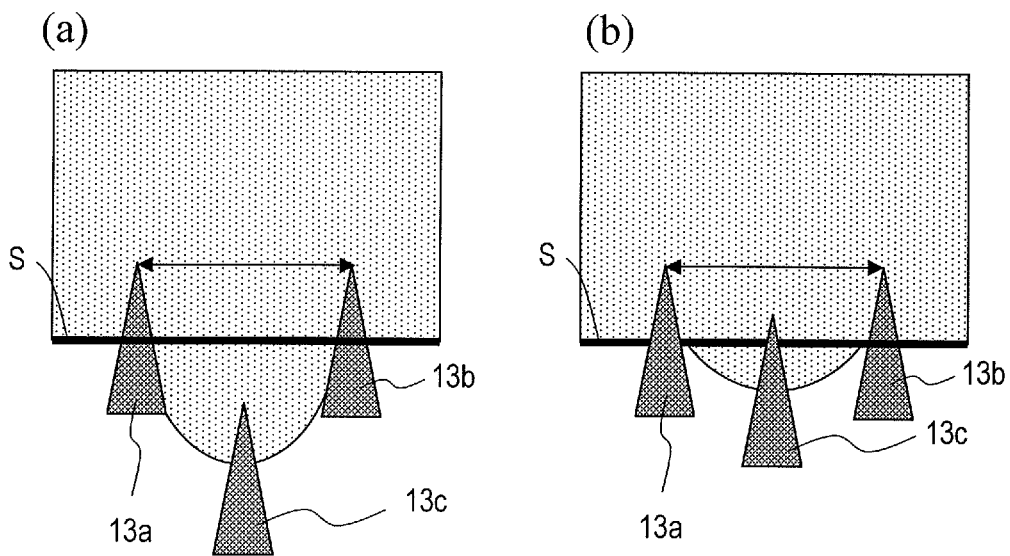
FIGS. 10(a) and (b) are schematic cross-sectional views for a case where the tip of a protrusion 13C at the bottom of the second recessed portion 14 is below a standard droplet level S and a case where the tip of the protrusion 13C at the bottom of the second recessed portion 14 is above the standard droplet level S.

FIG. 9 is a schematic cross-sectional view of a region including the second recessed portion 14, which is equivalent to FIG. 3(a). For convenience of description, in the cross section shown in FIG. 9, the opening of the second recessed portion 14 is represented by the line segment AB, and the diameter of the opening of the second recessed portion 14 is denoted by φ. The deepest point of the second recessed portion 14 is point C, and the midpoint of the line segment AB is point O. Since it is assumed herein that the second recessed portion 14 is realized by forming the plurality of minute recessed portions 15 in part of a spherical surface as described above, the cross section of the second recessed portion 14 can be approximately assumed as part of a circle. The descending angle α can be assumed as an angle which is formed between the tangent 1 at point A of the circle that is the cross section of the second recessed portion 14 and the line segment AB. Point O is the midpoint of the line segment AB. The line segment AB and the line segment OC are perpendicular to each other. Triangle ABC is an isosceles triangle in which the angle BAC and the angle ABC are equal to each other. With such configurations and the condition that the descending angle α is an angle formed between the tangent 1 and the line segment AB, the relationship of α=2α' holds true, where α' is the angle OAC. Hereinafter, the descending angle α (=2α') is calculated by determining the lower limit of the preferred range of α'.

The lower limit of α' can be determined as described hereinafter. FIGS. 10(a) and 10(b) are enlarged cross-sectional views schematically showing the second recessed portion 14 and its surroundings. As shown in FIGS. 10(a) and 10(b), protrusions 13a and 13b which are adjacent to the second recessed portion 14 and a protrusion 13c which resides at the bottom of the second recessed portion 14 are now considered. A case where the tip of the protrusion 13c residing at the bottom of the second recessed portion 14 is below the surface droplet level S (FIG. 10(a)) is preferred over a case where the tip of the protrusion 13c residing at the bottom of the second recessed portion 14 is above the surface droplet level S (FIG. 10(b)). This is because, in the case where the tip of the protrusion 13c residing at the bottom of the second recessed portion 14 is below the surface droplet level S (FIG. 10(a)), the area of a region where water is present at the surface droplet level S is larger, so that the contact angle can be decreased. In other words, angle α' is preferably greater than angle α' which is obtained when the vertex of the protrusion 13c residing at the bottom of the second recessed portion 14 is in contact with the surface droplet level S (FIG. 11).

The angle α' which is obtained when the protrusion residing at the bottom of the second recessed portion 14 is in contact with the surface droplet level S (FIG. 11) can be obtained as described below.

Figure 11:
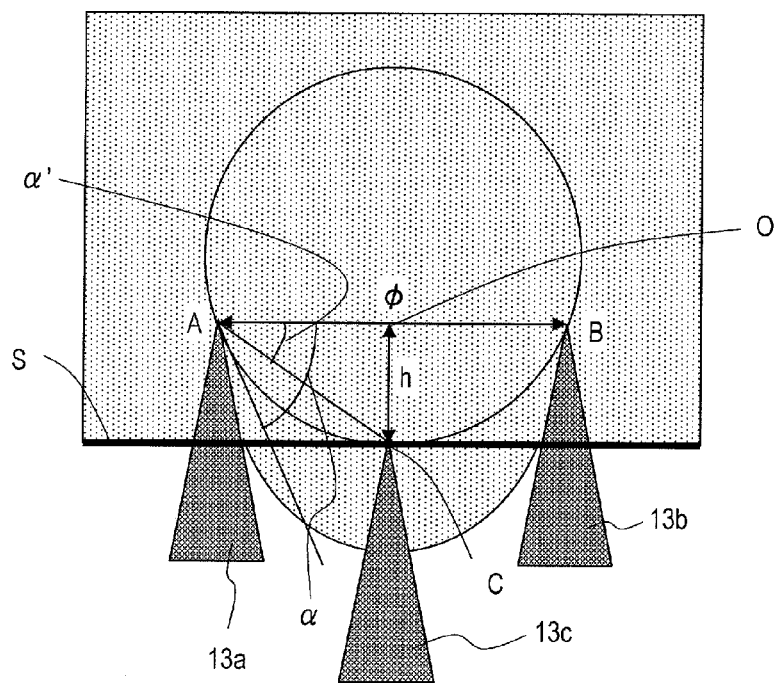
FIG. 11 A schematic cross-sectional view for a case where the tip of the protrusion 13C at the bottom of the second recessed portion 14 is just on the standard droplet level S.

As shown in FIG. 11, since OA=φ/2, formula (3) shown below holds true for the triangle OAC:

$$\tan \alpha' = h/(\phi/2) \tag{3}$$

where h is the distance from the opening of the second recessed portion 14 to the protrusion 13c residing at the bottom of the second recessed portion 14 (i.e., the length of the line segment OC). Based on formula (3), α' can be expressed by formula (4) shown below using h and φ.

$$\alpha' = \arctan(2h/\phi) \tag{4}$$

In the above-described moth-eye mold 10, the average value of the two-dimensional size of the second recessed portions 14 is 403 nm, and accordingly, it can be assumed that φ=403 nm.

Figure 12:
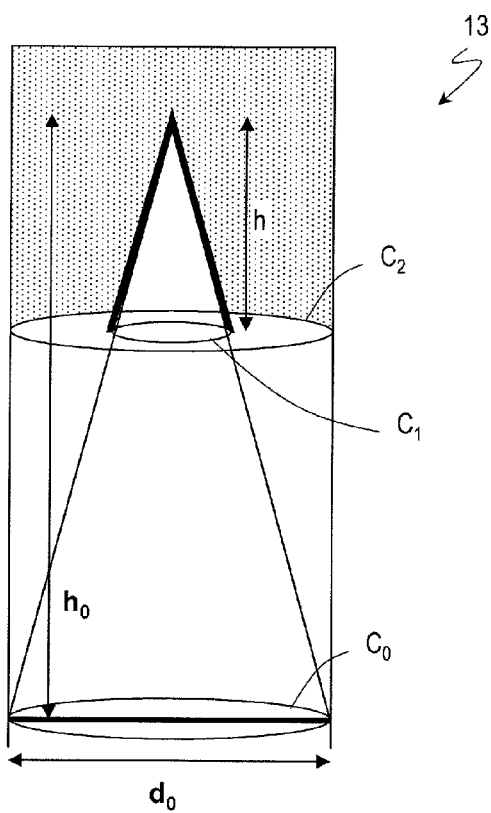
FIG. 12 A schematic perspective view of the protrusion 13.

On the other hand, h can be determined from the contact angle of the moth-eye mold 20B which does not have the second recessed portions, using the Cassie's formula (1) shown above. Hereinafter, how to calculate h is described with reference to FIG. 12. FIG. 12 is a schematic perspective view of one of the protrusions 13 that constitute the inverted moth-eye structure. Around the protrusion 13, part of the water droplet is present to the level of the depth h. Here, the diameter of the base of the protrusion 13 is $d_0$=190 nm, and the height of the protrusion 13 is $h_0$=380 nm. Hereinafter, firstly, the area of a cross-section of the protrusion 13 at the level of the depth h (circle $C_1$) is obtained, and the radius of the circle $C_1$ is calculated. Since the ratio of the radius of the circle $C_1$ to the depth h is equal to the ratio of the radius of the circle $C_0$ (the base of the protrusion 13) to $h_0$, the depth h can be calculated from the obtained radius of the circle $C_1$.

The area of the circle $C_1$ can be calculated as follows. As for the moth-eye mold 20B, in Cassie's formula (1), since θc=152.2°, θ1=110°, θ2=180°, and f1+f2=1, f1=0.1657 and f2=0.8343 are obtained. f1:f2 means the ratio of the surface area of part of the protrusion 13 extending down to the level of the depth h (the surface area of the cone) to the area of circle $C_2$ minus circle $C_1$ shown in FIG. 12. Thus, f1 and f2 are, respectively, the surface area of part of the protrusion 13 extending down to the level of the depth h and the area of circle $C_2$ minus circle $C_1$ on the assumption that the sum of the surface area of part of the protrusion 13 extending down to the level of the depth h and the area of circle $C_2$ minus circle $C_1$ is 1. Here, the area of the base of the protrusion 13 (circle $C_0$) is 28339 nm$^2$, and the surface area of the entire protrusion 13 (the surface area of the cone) is 116843 nm$^2$.

The ratio of the area of the circle $C_1$ to the surface area of part of the protrusion 13 extending down to the level of the depth h is equal to the ratio of the circle $C_0$ (28339 nm$^2$) to the surface area of the entire protrusion 13 (116843 nm$^2$). Thus, the area of the circle $C_1$ is (28339 nm$^2$)/(116843 nm$^2$) times the surface area of part of the protrusion 13 extending down to the level of the depth h. Assuming that the ratio of the area of the circle $C_2$ to the area of the circle $C_1$ is f2:f1', f1'=f1× ((28339 nm$^2$)/(116843 nm$^2$))=0.040. Since the area of the circle $C_0$ is equal to the area of the circle $C_2$, the area of the circle $C_1$ is f1'/(f1'+f2) times the area of the circle $C_0$. Therefore, the area of the circle $C_1$ is calculated at 1302 nm$^2$. Accordingly, the radius of the circle $C_1$ is 19.51 nm. Since the ratio of the radius of the circle $C_1$ to h is equal to the ratio of the height of the entire protrusion 13, $h_0$, to the radius of the base (circle $C_0$), $d_0$/2, h=81.45 nm.

From the obtained value of h and formula (4), $\alpha'$=22.15°. Since $\alpha$=2$\alpha'$, the lower limit of the preferred range of the descending angle $\alpha$ is 44.3°. Thus, when $\phi$=403 nm, it is preferred that $\alpha$ is not less than 44.3°.

In this way, the lower limit of the preferred range of the descending angle can be calculated from the two-dimensional size of the second recessed portions 14.

According to the moth-eye mold fabrication method of the above-described embodiment of the present invention, the largeness of the descending angle $\alpha$ of the second recessed portions can be adjusted by, for example, altering the etching duration of the first cycle of the etching step (the step of etching the aluminum base with the aluminum base in the etching solution being in contact with an electrode that contains a metal whose standard electrode potential is higher than that of the aluminum base) or by appropriately changing the concentration or distribution of a metal of a different type in the electrode and the aluminum base.

As described above, in addition to the moth-eye structure (micro structure), an uneven structure which is greater than the moth-eye structure (macro structure) is provided, whereby the antiglare function can be provided to an antireflection film (Patent Documents 1, 2, and 4). According to the researches conducted by the present inventors, the two-dimensional size of the raised portions of the uneven structure that performs the antiglare function is preferably not less than 400 nm and not more than 50 μm. From the viewpoint of the antiglare property, the raised portions of the uneven structure that performs the antiglare function are preferably greater than the wavelength of general visible light (about 400 nm). Furthermore, the raised portions of the uneven structure are preferably smaller than the size of the pixels of a display panel over which the antireflection film is to be provided (generally greater than 50 μm). The area ratio of the raised portions of the antiglare structure is preferably not less than 0.8%. From the viewpoint of the antireflection function, the two-dimensional size of the raised portions of the moth-eye structure is preferably not less than 100 nm and not more than 200 nm.

The raised portions obtained by inverting the second recessed portions 14 of the moth-eye mold 10 of the present embodiment can perform the antiglare function. Therefore, in the case where the raised portions which constitute the antiglare structure are realized by the second recessed portions 14, the two-dimensional size of the second recessed portions 14 is preferably not less than 400 nm and not more than 50 μm, and the area ratio of the second recessed portions 14 is preferably not less than 0.8%. The two-dimensional size of the first recessed portions 12 is preferably not less than 100 nm from the viewpoint of the mechanical strength of the raised portions obtained by transferring the first recessed portions 12, and is preferably not more than 200 nm from the viewpoint of the antireflection function.

According to the moth-eye mold fabrication method of the above-described embodiment of the present invention, the moth-eye mold 10 can be fabricated such that the area ratio of the second recessed portions 14 whose two-dimensional size is not less than 400 nm and not more than 50 μm is not less than 0.8% by, for example, altering the etching duration of the first cycle of the etching step (the step of etching the aluminum base with the aluminum base in the etching solution being in contact with an electrode that contains a metal whose standard electrode potential is higher than that of the aluminum base) or by appropriately changing the concentration or distribution of a metal of a different type in the electrode and the aluminum base. As described above, according to the moth-eye mold fabrication method of the embodiment of the present invention, the second recessed portions 14 are realized by forming the plurality of minute recessed portions 15 in the inner surfaces of the recessed portions 17 formed by galvanic corrosion. Since the amount of galvanic corrosion increases as the etching duration increases, the second recessed portions formed have a larger size. Since the frequency of galvanic corrosion increases as the etching duration increases, the recessed portions 17 are formed in an increased number of portions. Thus, as the etching duration increases, the number of the second recessed portions 14 increases. Therefore, as the etching duration increases, the area ratio of the second recessed portions 14 increases. The portions in which the galvanic corrosion occurs may vary depending on the concentration of a metal of a different type or the distribution of a metal of a different type in the electrode and the aluminum base. Therefore, the two-dimensional size and the area ratio of the second recessed portions 14 can be controlled by adjusting the etching duration or by adjusting the concentration or distribution of a metal of a different type in the electrode and the aluminum base.

In the moth-eye mold 10 of the embodiment of the present invention, the descending angle of the inner surfaces of the second recessed portions 14 is, for example, 90°. In the moth-eye mold 10 shown in FIG. 1, the descending angle $\alpha$ of the second recessed portions 14 is 90°, i.e., the second recessed portions 14 have steeply-descending inner surfaces. The raised portions obtained by inverting the second recessed portions 14 that have steeply-descending inner surfaces have steeply-ascending slopes. If raised portions which have steeply-ascending slopes (which have a steep ascending angle $\beta$) are provided as the raised portions of the antireflection film which perform the antiglare function, the internal reflection can be reduced, as will be described below, as compared with a conventional antiglare layer which has a moderately-ascending slope.

Figure 13:
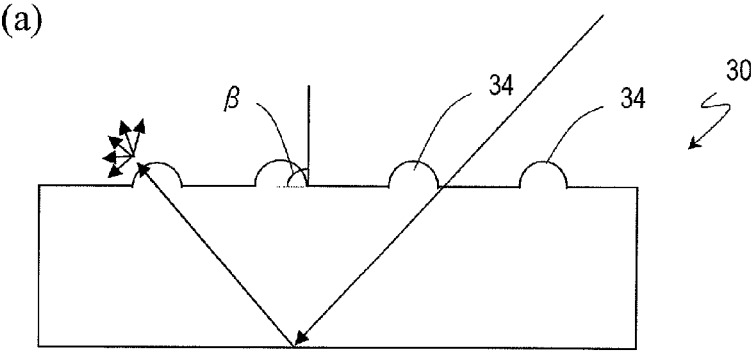
FIGS. 13(a) and (b) are schematic diagrams for illustrating the difference in scattering effect due to the shape of raised portions of antireflection films.
Figure 13:
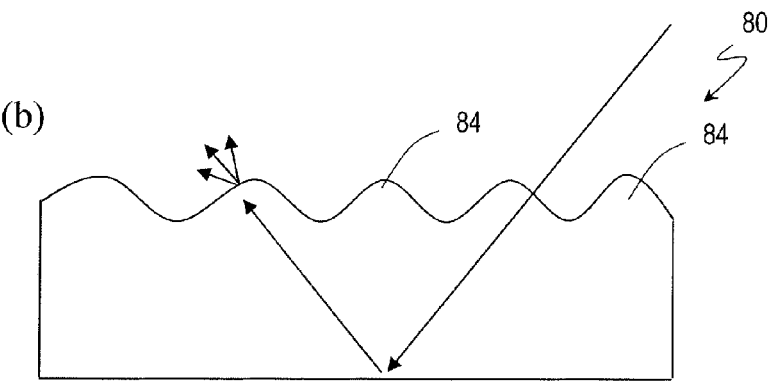
Figure 14:
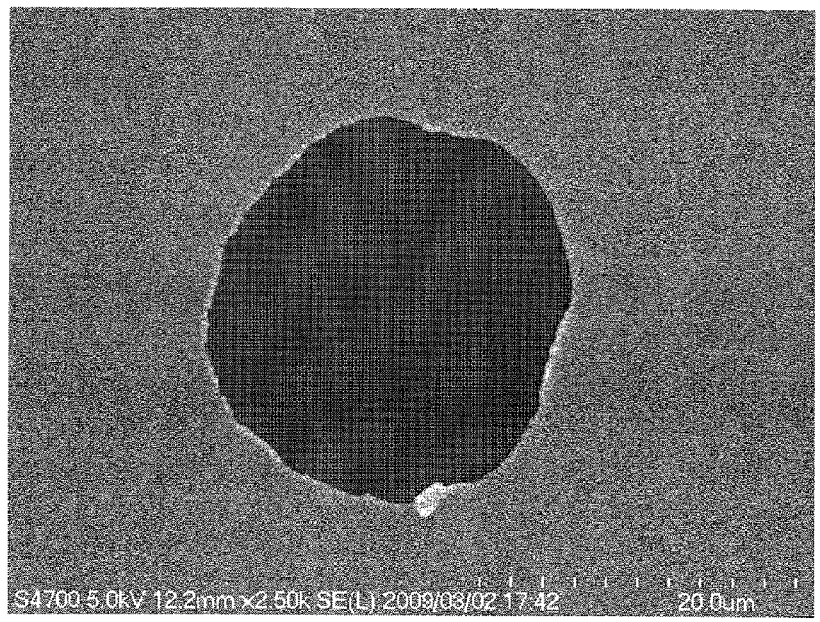
FIG. 14 A SEM image of a portion of a work in which the moth-eye structure was not formed.

FIG. 13(a) shows a schematic cross-sectional view of an antireflection film 30 that was fabricated using a mold which has recessed portions (second recessed portions 14) whose descending angle $\alpha$ is 90°. The antireflection film 30 has a plurality of first raised portions (not shown) whose two-dimensional size is not less than 100 nm and not more than 200 nm and a plurality of second raised portions 34 whose two-dimensional size is not less than 400 nm and not more than 50 μm, which are realized by transferring the surface geometry of the moth-eye mold 10 that has the plurality of first recessed portions 12 whose two-dimensional size is not less than 100 nm and not more than 200 nm and the plurality of second recessed portions 14 whose two-dimensional size is not less than 400 nm and not more than 50 μm. The ascending angle β of the second raised portions 34 is 90°. The antireflection film 30 can be manufactured by, for example, curing a photocurable resin (e.g., acrylic resin) provided between a base (e.g., a polymer film of TAC, PET, or the like) and the moth-eye mold 10. As schematically shown in FIG. 13(a), the second raised portions 34 can efficiently scatter light which is reflected inside an unshown display panel toward the viewer side. FIG. 13(b) shows a schematic cross-sectional view of an antireflection film 80 which has a conventional antiglare layer. As schematically shown in FIG. 13(b), raised portions 84 of the surface of the conventional antiglare layer have moderately-ascending slopes, so that the function of scattering the internal reflection is small.

The ascending angle β of the second raised portions 34 is preferably not less than 2°. This is because, if the ascending angle β is smaller than 2°, the surface of the antireflection film 30 is approximately flat, so that the antiglare property is poor. It is seen from this fact that, in the case where the raised portions that constitute the antiglare structure are realized by the second recessed portions 14, the descending angle α of the second recessed portions 14 is preferably not less than 2° and not more than 90°.

INDUSTRIAL APPLICABILITY

A mold of the present invention can be widely used in formation of a surface which has a moth-eye structure, for example, formation of an antireflection film.

REFERENCE SIGNS LIST 10 mold
11 base
12 first recessed portion
14 second recessed portion
15 minute recessed portion
17 recessed portion

The invention claimed is:

1. A mold, comprising:
an anodized porous alumina layer over its surface, the anodized porous alumina layer having a plurality of first recessed portions and a plurality of second recessed portions, wherein
the plurality of second recessed portions have a two-dimensional size of not less than 190 nm and not more than 50 μm when viewed in a direction normal to the mold surface, the plurality of second recessed portions having a plurality of minute recessed portions over its inner surface, the plurality of minute recessed portions having a two-dimensional size of not less than 10 nm and not more than 200 nm, and a distribution of the plurality of second recessed portions has no regularity,
the plurality of first recessed portions have a two-dimensional size of not less than 10 nm and not more than 200 nm, the plurality of first recessed portions being provided between the plurality of second recessed portions, and
an average value of the two-dimensional size of the plurality of second recessed portions is greater than an average value of the two-dimensional size of the plurality of first recessed portions.

2. The mold of claim 1, wherein an area ratio of the plurality of second recessed portions is not less than 0.7%.

3. The mold of claim 1, wherein the average value of the two-dimensional size of the plurality of second recessed portions is not less than 2.73 times the average value of the two-dimensional size of the plurality of first recessed portions.

4. The mold of claim 1, wherein a descending angle of the inner surface of the plurality of second recessed portions relative to the mold surface is not more than 90°.

5. The mold of claim 2, wherein
the two-dimensional size of the plurality of second recessed portions is not less than 400 nm and not more than 50 μm, and
the area ratio of the plurality of second recessed portions is not less than 0.8%.

6. An antireflection film manufactured using the mold of claim 5, wherein
the antireflection film has a plurality of first raised portions and a plurality of second raised portions over its surface, the plurality of first raised portions having a base whose two-dimensional size is not less than 100 nm and not more than 200 nm, the plurality of second raised portions having a two-dimensional size of not less than 400 nm and not more than 50 μm, and
an ascending angle of the plurality of second raised portions relative to the surface is not more than 90°.

7. A method of fabricating the mold of claim 1, the method comprising the steps of:
(a) providing an aluminum film or an aluminum base whose purity is not less than 99.5 mass %;
(b) performing an etching on a surface of the aluminum film or the aluminum base with the surface of the aluminum film or the aluminum base in an etching solution being in contact with a metal whose standard electrode potential is higher than that of the aluminum film or the aluminum base, thereby forming a plurality of recessed portions whose two-dimensional size is not less than 190 nm and not more than 50 μm; and
(c) after step (b), anodizing the surface of the aluminum film or the aluminum base to form a porous alumina layer over an inner surface of the plurality of recessed portions and between the plurality of recessed portions, thereby forming the plurality of first recessed portions and the plurality of second recessed portions.

8. The method of claim 7, further comprising:
(d) after step (c), bringing the porous alumina layer into contact with the etching solution, thereby enlarging the plurality of minute recessed portions and the plurality of first recessed portions; and
(e) after step (d), further anodizing the surface of the aluminum film or the aluminum base, thereby growing the plurality of minute recessed portions and the plurality of first recessed portions.

9. The method of claim 7, further comprising:
(f) between step (a) and step (b), anodizing the surface of the aluminum film or the aluminum base, thereby forming an anodized layer; and
(g) between step (b) and step (c), dissolving away the anodized layer.

10. The mold of claim 1, wherein the plurality of second recessed portions comprise:
a second recessed portion having the two-dimensional size of not less than 190 nm and less than 250 nm,
a second recessed portion having the two-dimensional size of not less than 250 nm and less than 300 nm, and
a second recessed portion having the two-dimensional size of not less than 300 nm and less than 350 nm.

11. The mold of claim 1, wherein the plurality of second recessed portions comprise:
- a second recessed portion having the two-dimensional size of not less than 350 nm and less than 450 nm,
- a second recessed portion having the two-dimensional size of not less than 450 nm and less than 550 nm, and
- a second recessed portion having the two-dimensional size of not less than 550 nm and less than 650 nm.

* * * * *